(12) United States Patent
Hoki et al.

(10) Patent No.: US 10,066,525 B2
(45) Date of Patent: Sep. 4, 2018

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Yusuke Hoki, Mishima (JP); Shinji Ikeda, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 288 days.

(21) Appl. No.: 15/175,611

(22) Filed: Jun. 7, 2016

(65) Prior Publication Data
US 2016/0363022 A1  Dec. 15, 2016

(30) Foreign Application Priority Data
Jun. 9, 2015 (JP) ................ 2015-116667

(51) Int. Cl.
*F01N 3/00* (2006.01)
*F01N 3/20* (2006.01)
(Continued)

(52) U.S. Cl.
CPC .............. *F01N 3/202* (2013.01); *F01N 3/02* (2013.01); *F01N 3/035* (2013.01); *F01N 3/101* (2013.01);
(Continued)

(58) Field of Classification Search
CPC .............. F01N 2240/05; F01N 3/202; B01J 2219/0852; B01J 2219/0854; F02M 27/04; F02M 2027/047
See application file for complete search history.

(56) References Cited

U.S. PATENT DOCUMENTS 5,423,180 A * 6/1995 Nobue .................... F01N 3/028
  60/274
6,365,885 B1 * 4/2002 Roy ......................... C04B 35/64
  148/525

(Continued)

FOREIGN PATENT DOCUMENTS

| DE | 10050464 A1 | 4/2002 |
| JP | 4-241717 A | 8/1992 |
| JP | 2006-158947 A | 6/2006 |

*Primary Examiner* — Mark Laurenzi
*Assistant Examiner* — Jason Sheppard
(74) *Attorney, Agent, or Firm* — Hunton Andrews Kurth LLP

(57) ABSTRACT

An exhaust gas control system includes: a housing, an exhaust gas purification catalyst, and a microwave irradiator. The microwave irradiator is configured to irradiate the exhaust gas purification catalyst with a microwave such that a standing wave that has: a high magnetic field region; and a high electric field region. The exhaust gas purification catalyst includes a carrier substrate and a catalytic substance that purifies the exhaust gas. The catalytic substance is disposed on the carrier substrate. The carrier substrate includes a magnetic body region and a dielectric region. The magnetic body region of the carrier substrate is disposed in the high magnetic field region in the housing. The dielectric region of the carrier substrate is disposed in the high electric field region in the housing. The magnetic body region has a magnetic body that absorbs the microwave. The dielectric region has a dielectric that absorbs the microwave.

14 Claims, 18 Drawing Sheets

(51) Int. Cl.
  *F01N 3/10*   (2006.01)
  *F01N 3/035*  (2006.01)
  *F01N 3/02*   (2006.01)

(52) U.S. Cl.
  CPC ........... *F01N 2240/05* (2013.01); *Y02T 10/22* (2013.01); *Y02T 10/26* (2013.01)

(56) References Cited

U.S. PATENT DOCUMENTS

| | | |
|---|---|---|
| 7,513,921 B1 | 4/2009 | Phelps et al. |
| 2017/0022868 A1* | 1/2017 | Crawford .............. F01N 3/2013 |

* cited by examiner

EXHAUST GAS CONTROL SYSTEM FOR INTERNAL COMBUSTION ENGINE

INCORPORATION BY REFERENCE

The disclosure of Japanese Patent Application No. 2015-116667 filed on Jun. 9, 2015 including the specification, drawings and abstract is incorporated herein by reference in its entirety.

BACKGROUND OF THE INVENTION

1. Field of the Invention

Embodiments of the present invention relate to an exhaust gas control system for an internal combustion engine.

2. Description of Related Art

An air purifier has been known that includes: an air purification catalyst that is disposed in an air passage and purifies air; and a microwave irradiator that is disposed on an upstream side of the air purification catalyst in the air passage and irradiates the air purification catalyst with a microwave at a specified frequency, in which the air purification catalyst includes a carrier substrate and a catalytic substance that is disposed on the carrier substrate and purifies the air, in which the carrier substrate contains a heating body that can absorb the microwave, and in which the heating body absorbs the microwave from the microwave irradiator and thereby generates heat (see Japanese Patent Application Publication No. 2006-158947 (JP 2006-158947 A), for example).

Typically, the catalytic substance does not function as a catalyst until it reaches an activation temperature or higher. Thus, in JP 2006-158947 A, the heating body generates the heat by using the microwave and heats the carrier substrate, and the catalytic substance on the carrier substrate is thereby heated to the activation temperature or higher.

SUMMARY

In JP 2006-158947 A, the air passage, in which the air purification catalyst is disposed, is coated with an electromagnetic wave shield member. Thus, although it is not explicitly described in JP 2006-158947 A, a standing wave in which a traveling wave and a reflected wave of the microwave are combined is formed in the air passage that is coated with the electromagnetic wave shield member, and the heating body absorbs the standing wave of the microwave and thereby generates the heat. Here, the standing wave has: a high electric field region in which electric field intensity is relatively high; and a low electric field region in which the electric field intensity is relatively low. Where a dielectric is used as the heating body, the heating body generates the heat in the high electric field region but does not generate a substantial amount of the heat in the low electric field region. Thus, a region that sufficiently generates the heat and a region that does not sufficiently generate the heat are created in the carrier substrate. As a result, the catalytic substance on the carrier substrate may not evenly be heated. Here, a method for heating the air purification catalyst in above JP 2006-158947 A can also be applied to a method for heating an exhaust gas purification catalyst for an internal combustion engine. However, the problem that the catalytic substance on the carrier substrate may not evenly be heated remains. As a result, exhaust gas may not sufficiently be purified by the exhaust gas purification catalyst.

Embodiments of the present invention provide an exhaust gas control system that substantially evenly heats an exhaust gas purification catalyst of an internal combustion engine by using a microwave irradiator. An exhaust gas control system for an internal combustion engine according to one embodiment of the invention includes a housing, an exhaust gas purification catalyst, and a microwave irradiator. The housing is disposed in an exhaust passage of the internal combustion engine. The exhaust gas purification catalyst is disposed in the housing. The exhaust gas purification catalyst is configured to purify exhaust gas of the internal combustion engine. The microwave irradiator is disposed on an upstream side or a downstream side of the exhaust gas purification catalyst in the exhaust passage. The microwave irradiator is configured to irradiate the exhaust gas purification catalyst with a microwave at a specified frequency such that a standing wave that has: a high magnetic field region where magnetic field intensity becomes at least equal to a specified rate of a maximum value of the magnetic field intensity; and a high electric field region where electric field intensity becomes at least equal to a specified rate of a maximum value of the electric field intensity and in which a position where the magnetic field intensity reaches the maximum value and a position where the electric field intensity reaches the maximum value differ from each other is formed in the housing by the microwave. The exhaust gas purification catalyst includes a carrier substrate and a catalytic substance that purifies the exhaust gas. The catalytic substance is disposed on the carrier substrate. The carrier substrate includes a magnetic body region and a dielectric region. The magnetic body region of the carrier substrate is disposed in the high magnetic field region in the housing. The dielectric region of the carrier substrate is disposed in the high electric field region in the housing. The magnetic body region has a magnetic body that absorbs the microwave. The dielectric region has a dielectric that absorbs the microwave.

According to the exhaust gas control system of the above embodiment, the catalytic substance can substantially evenly be heated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
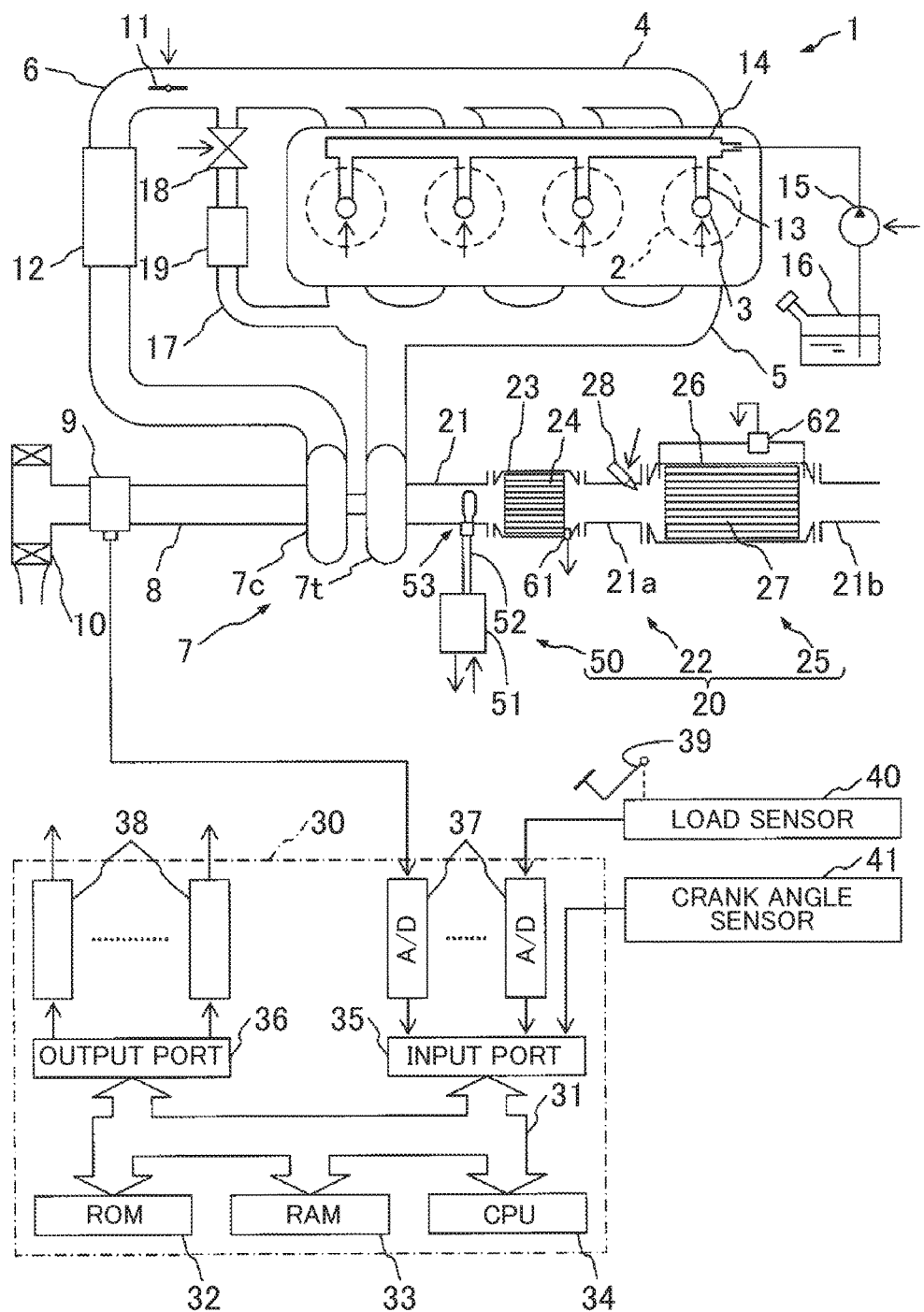
FIG. 1 is an overall view of an internal combustion engine to which an exhaust gas control system is applied.

With reference to FIG. 1, a main body 1 of an internal combustion engine of a compression ignition type is provided with a combustion chamber 2 for each cylinder, an electromagnetic control fuel injection valve 3 for injecting fuel into the combustion chamber 2, an intake manifold 4, and an exhaust manifold 5. The intake manifold 4 is coupled to an exit of a compressor 7c of an exhaust gas turbocharger 7 via an intake duct 6, and an entry of the compressor 7c is sequentially coupled to an airflow meter 9 and an air cleaner 10 via an intake introduction pipe 8. In the intake duct 6, an electric control throttle valve 11 is disposed, and a cooler 12 for cooling intake air that flows through the intake duct 6 is further disposed around the intake duct 6. Meanwhile, the exhaust manifold 5 is coupled to an entry of an exhaust gas turbine 7t of the exhaust gas turbocharger 7, and an exit of the exhaust gas turbine 7t is coupled to an exhaust pipe 21 as an engine exhaust gas passage. An exhaust gas aftertreatment system 20 is coupled to the exhaust pipe 21.

Each of the fuel injection valves 3 is coupled to a common rail 14 via a fuel supply pipe 13, and this common rail 14 is coupled to a fuel tank 16 via an electric control fuel pump 15 that can change a discharge amount. The fuel is reserved in the fuel tank 16 in a liquid form. The fuel in the fuel tank 16 is supplied to the common rail 14 by the fuel pump 15, and the fuel that is supplied to the common rail 14 is supplied to the fuel injection valves 3 via each of the fuel supply pipes 13. In an embodiment of the invention, this fuel is configured as diesel fuel. In another embodiment, which is not shown, the internal combustion engine is configured as an internal combustion engine of a spark ignition type that combusts the fuel at a lean air-fuel ratio. In such an embodiment, the fuel is configured as gasoline.

The exhaust manifold 5 and the intake manifold 4 are coupled to each other via an exhaust gas recirculation (hereinafter referred to as EGR) passage 17, and an electric control EGR control valve 18 is disposed in the EGR passage 17. In addition, a cooler 19 for cooling EGR gas that flows through the EGR passage 17 is disposed around the EGR passage 17.

In the embodiment shown in FIG. 1, the exhaust gas aftertreatment system 20 includes a startup exhaust gas control apparatus 22. An entry of a housing 23 of the startup exhaust gas control apparatus 22 is coupled to the exhaust pipe 21 on a downstream side of the exhaust gas turbine 7t, and an exit of the housing 23 is coupled to an exhaust pipe 21a. A startup exhaust gas purification catalyst 24 is disposed in the housing 23. In the embodiment shown in FIG. 1, the startup exhaust gas purification catalyst 24 contains a carrier substrate and an exhaust gas purification catalyst that is deposited on the carrier substrate. The exhaust gas purification catalyst is in a relatively low volume and is activated in a short time period, that is, warming thereof is completed in a short time period. In the embodiment shown in FIG. 1, the exhaust gas purification catalyst is a three-way catalyst. The three-way catalyst is substantially evenly deposited on the entire carrier substrate. In addition, the exhaust gas aftertreatment system 20 further includes a microwave irradiator 50. A microwave radiator 53 of the microwave irradiator 50 is disposed in the exhaust pipe 21 that is located on an upstream side of the startup exhaust gas control apparatus 22. A microwave oscillator 51 is connected to the microwave radiator 53 via a transmission line 52. The microwave radiator 53 radiates a microwave and receives the microwave. An antenna such as a loop antenna is used as the microwave radiator 53. The microwave oscillator 51 generates the microwave, can change a frequency and a phase of the generated microwave, and can measure a frequency, a phase, and intensity of the received microwave. Noted that the microwave is a traveling wave, a reflected wave, or a combined wave in which those are combined, that is, a standing wave. A semiconductor oscillator that uses a semiconductor device such as a Gunn diode is used as the microwave oscillator 51. The transmission line 52 transmits the microwave that is generated in the microwave oscillator 51 to the microwave radiator 53, and transmits the microwave that is received by the microwave radiator 53 to the microwave oscillator 51. For example, a coaxial cable is used as the transmission line 52. The microwave that is generated in the microwave oscillator 51 is radiated from the microwave radiator 53 toward the startup exhaust gas purification catalyst 24 through the transmission line 52 and heats the startup exhaust gas purification catalyst 24. In the embodiment shown in FIG. 1, the frequency of the microwave is 2.45 GHz.

In addition, the exhaust gas aftertreatment system 20 further includes a primary exhaust gas control apparatus 25. An entry of a housing 26 of the primary exhaust gas control apparatus 25 is coupled to the exhaust pipe 21a that is on the downstream side of the startup exhaust gas control apparatus 22, and an exit of the housing 26 is coupled to an exhaust pipe 21b. A primary exhaust gas purification catalyst 27 is disposed in the housing 26. In the embodiment shown in FIG. 1, the primary exhaust gas purification catalyst 27 is configured by including: a particulate filter that collects particulate matters in exhaust gas; and a NOx occlusion reduction catalyst that is deposited on the particulate filter and purifies NOx. In addition, an electromagnetic addition valve 28 that secondarily supplies hydrocarbon or the fuel in the liquid form is attached to the exhaust pipe 21a that is located on an upstream side of the primary exhaust gas purification catalyst 27. The addition valve 28 is coupled to the fuel tank 16 via another fuel pump, which is not shown. The fuel in the fuel tank 16 is supplied to the addition valve 28 by the other fuel pump and is next supplied to the primary exhaust gas purification catalyst 27 by the addition valve 28.

An electronic control unit 30 is constructed of a digital computer and is equipped with a read only memory (ROM) 32 that is mutually connected to a bidirectional bus 31, a random access memory (RAM) 33, a microprocessor (CPU) 34, an input port 35, and an output port 36. A temperature sensor 61 for detecting a temperature of the exhaust gas that flows out of the startup exhaust gas purification catalyst 24 is attached on the inside of the housing 23 that is located on a downstream side of the startup exhaust gas purification catalyst 24. This temperature of the exhaust gas represents a temperature of the startup exhaust gas purification catalyst 24. In addition, a differential pressure sensor 62 that detects fore-and-aft differential pressure of the primary exhaust gas purification catalyst 27 is attached to the housing 26. An output voltage of each of the airflow meter 9, the microwave oscillator 51, the temperature sensor 61, and the differential pressure sensor 62 is input to the input port 35 via a corresponding AD converter 37. Furthermore, a load sensor 40 for generating an output voltage that is proportional to a depression amount of an accelerator pedal 39 is connected to the accelerator pedal 39, and the output voltage of the load sensor 40 is input to the input port 35 via the corresponding AD converter 37. Moreover, a crank angle sensor 41 that generates an output pulse every time a crankshaft rotates 30 degrees, for example, is connected to the input port 35. In the CPU 34, an engine speed is computed on the basis of the output pulse from the crank angle sensor 41. Meanwhile, the output port 36 is connected to the fuel injection valve 3, a drive unit of the throttle valve 11, the fuel pump 15, the EGR control valve 18, the microwave oscillator 51, the addition valve 28, and the other fuel pump (not shown) via corresponding drive circuits 38.

Figure 2A:
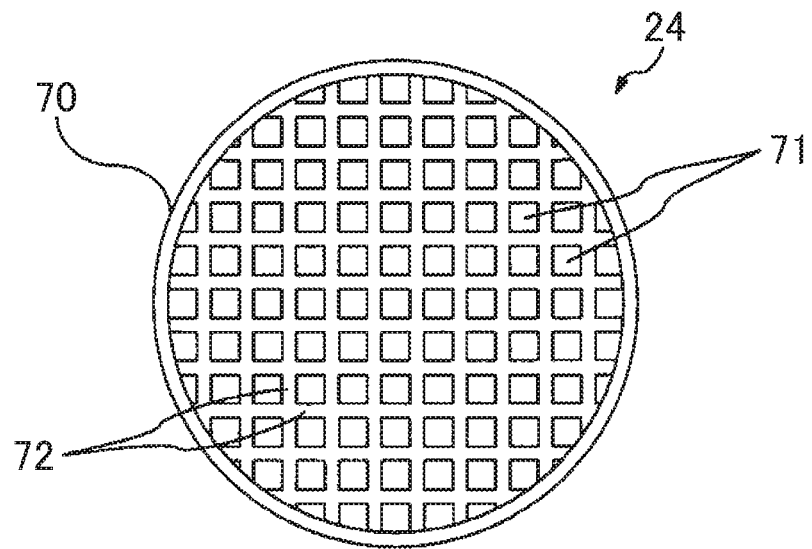
FIG. 2A is a front view of a startup exhaust gas purification catalyst.
Figure 2B:
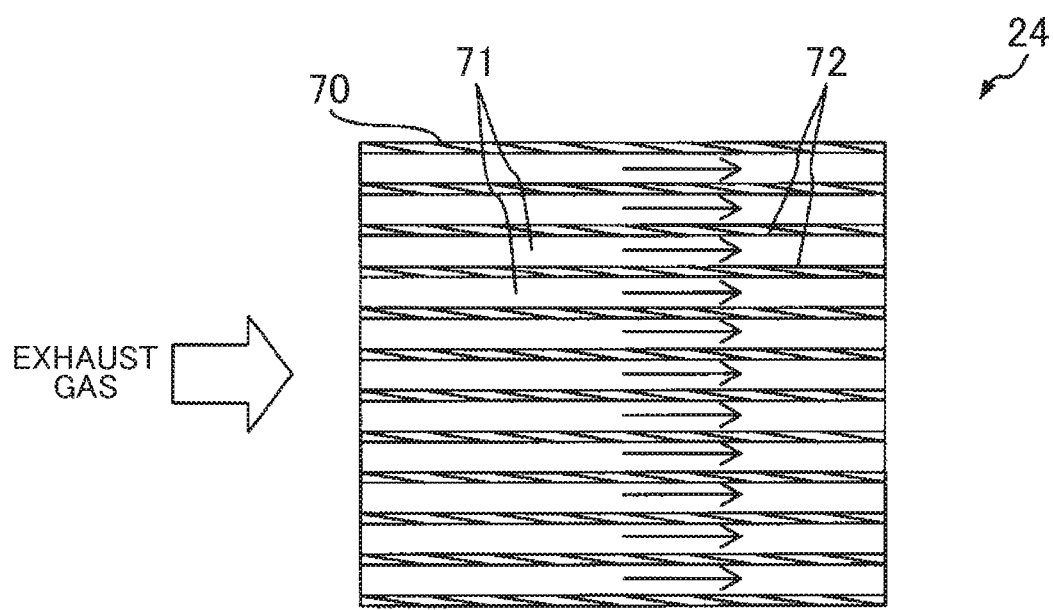
FIG. 2B is a side cross-sectional view of a startup exhaust gas purification catalyst.

In the embodiment shown in FIG. 1, the startup exhaust gas purification catalyst 24 of the startup exhaust gas control apparatus 22 has a following configuration in detail. FIG. 2A and FIG. 2B are respectively a front view and a side cross-sectional view that show a configuration example of the startup exhaust gas purification catalyst 24. As shown in FIG. 2A and FIG. 2B, the startup exhaust gas purification catalyst 24 includes a carrier substrate 70 that has a straight-flow honeycomb structure, and a shape of the startup exhaust gas purification catalyst 24, that is, a shape of the carrier substrate 70 is a substantially columnar shape. The carrier substrate 70 has: plural units of exhaust stream passages 71 that extend in parallel with each other; and partition walls 72 that partition these exhaust stream passages 71 from each other. The exhaust stream passage 71 is constructed of an exhaust gas passage, an upstream end and a downstream end of which are opened. As shown by arrows in FIG. 2B, the exhaust gas flows into the exhaust stream passage 71 from the upstream end and flows out from the downstream end.

In the embodiment shown in FIG. 1, the particulate filter of the primary exhaust gas purification catalyst 27 in the primary exhaust gas control apparatus 25 has a wall-flow honeycomb structure. A ratio of the air and the fuel or hydrocarbon that are supplied to an engine intake passage, the combustion chamber 2, and an exhaust passage on the upstream side of the primary exhaust gas purification catalyst 27 is referred to as an air-fuel ratio of the exhaust gas. Where a term occlusion is used as a term that contains absorption and adsorption, the NOx occlusion reduction catalyst on the particulate filter has a function of occluding NOx at a time when the air-fuel ratio of the exhaust gas is lean and releasing and reducing occluded NOx at a time when oxygen concentration in the exhaust gas is decreased.

The NOx occlusion reduction catalyst includes: a noble metal catalyst that contains platinum (Pt); and a basic layer that contains an alkali metal element such as potassium (K), an alkali-earth metal element such as barium (Ba), a rare-earth element such as lanthanum (La), and a metal such as silver (Ag) that can provide an electron to NOx.

In the embodiment shown in FIG. 1, combustion is conducted with excess oxygen in the combustion chamber 2. In this embodiment, the air-fuel ratio of the inflow exhaust gas to the NOx occlusion reduction catalyst is maintained to be lean, and, at this time, NOx in the inflow exhaust gas is occluded in the NOx occlusion reduction catalyst. Then, if an amount of NOx that is occluded in the NOx occlusion reduction catalyst exceeds a preset threshold amount, the fuel is secondarily supplied from the addition valve 28, and the air-fuel ratio of the inflow exhaust gas is shifted to be rich or a theoretical air-fuel ratio. Because the air-fuel ratio is shifted to be rich or the theoretical air-fuel ratio, NOx is released from the NOx occlusion reduction catalyst, is reduced, and becomes nitrogen gas. In this way, the exhaust gas is purified and discharged.

Although details will be described below, the carrier substrate of the startup exhaust gas purification catalyst 24 contains: a magnetic body that can absorb the microwave at a specified frequency (e.g., 2.45 GHz) that is output from the microwave irradiator 50; and a dielectric that can absorb the microwave at the specified frequency.

Figure 3:
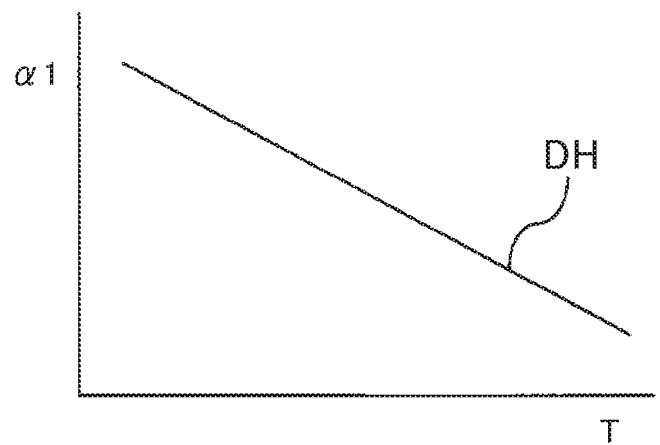
FIG. 3 is a graph that shows a characteristic of a magnetic body.

A magnetic body that includes the magnetic body in the carrier substrate typically has a characteristic shown in FIG. 3. In FIG. 3, a horizontal axis indicates a temperature T, and a vertical axis indicates a microwave absorption rate $\alpha 1$ of the magnetic body. Here, the microwave absorption rate $\alpha 1$ is a ratio of energy of the microwave that is absorbed by the magnetic body to energy of the microwave at the specified frequency (e.g., 2.45 GHz) with which the magnetic body is irradiated. As indicated by a line DH in the graph, the microwave absorption rate $\alpha 1$ is monotonically decreased with an increase of the temperature T in the magnetic body. As materials of the magnetic body in the carrier substrate, iron (Fe), cobalt (Co), and nickel (Ni) or a ferromagnetic body such as a combination of those as well as a ferrimagnetic body such as ferrite ($Fe_3O_4$) are exemplified.

Figure 4:
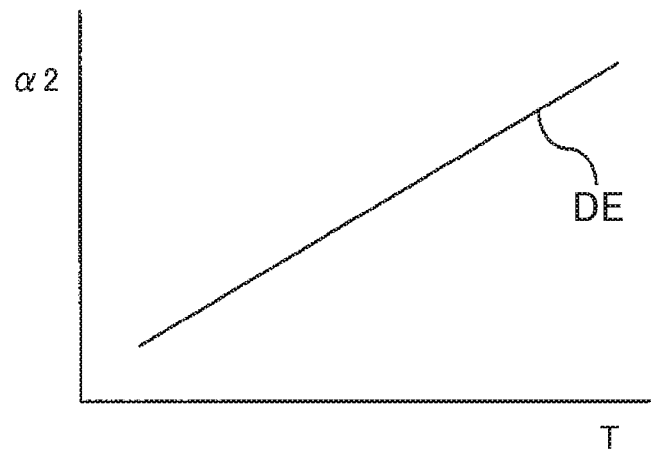
FIG. 4 is a graph that shows a characteristic of a dielectric.

A dielectric that includes the dielectric in the carrier substrate typically has a characteristic shown in FIG. 4. In FIG. 4, a horizontal axis indicates the temperature T, and a vertical axis indicates a microwave absorption rate $\alpha 2$ of the dielectric. Here, the microwave absorption rate $\alpha 2$ is a ratio of energy of the microwave that is absorbed by the dielectric to energy of the microwave at the specified frequency (e.g., 2.45 GHz) with which the dielectric is irradiated. As indicated by a line DE in the graph, the microwave absorption rate $\alpha 2$ is monotonically increased with the increase of the temperature T in the dielectric. As materials of the dielectric in the carrier substrate, oxides and carbides such as silicon carbide (SiC), aluminum oxide ($Al_2O_3$), boron carbide ($B_4C$), strontium titanate ($SrTiO_3$), zirconia ($ZrO_2$), yttria ($Y_2O_3$), and lead zirconate titanate (PZT) are exemplified.

The material of the dielectric in the carrier substrate differs from the material of the magnetic body in the carrier substrate. In addition, the magnetic body in the carrier substrate may absorb energy of an electric field in addition to absorbing energy of a magnetic field. Furthermore, the dielectric in the carrier substrate may absorb the energy of the magnetic field in addition to absorbing the energy of the electric field. However, an absorption amount of the energy of the magnetic field by the magnetic body is larger than an absorption amount of the energy of the magnetic field by the dielectric. In addition, an absorption amount of the energy of the electric field by the dielectric is larger than an absorption amount of the energy of the electric field by the magnetic body.

The carrier substrate is formed of a porous material that the microwave at the specified frequency (e.g., 2.45 GHz) can substantially penetrate. As materials of the carrier substrate, ceramics such as cordierite ($2MgO.2Al_2O_3.5SiO_2$), silica ($SiO_2$), and mullite ($3Al_2O_3.2SiO_2$) are raised.

The three-way catalyst as a catalytic substance purifies carbon monoxide (CO), hydrocarbon (HC), and nitrogen oxide (NOx) in the exhaust gas. As the three-way catalyst, a catalyst in which a noble metal catalyst formed of platinum (Pt), palladium (Pd), and rhodium (Rh) is deposited on an oxide carrier such as ceria ($CeO_2$) or ceria ($CeO_2$)-zirconia ($ZrO_2$) is exemplified.

Next, a description will be made on the standing wave of the microwave that is generated in the housing 23 of the startup exhaust gas purification catalyst 24 by the microwave irradiator 50 with reference to FIG. 5 to FIG. 7. In the standing wave, the traveling wave and the reflected wave are combined.

Figure 5:
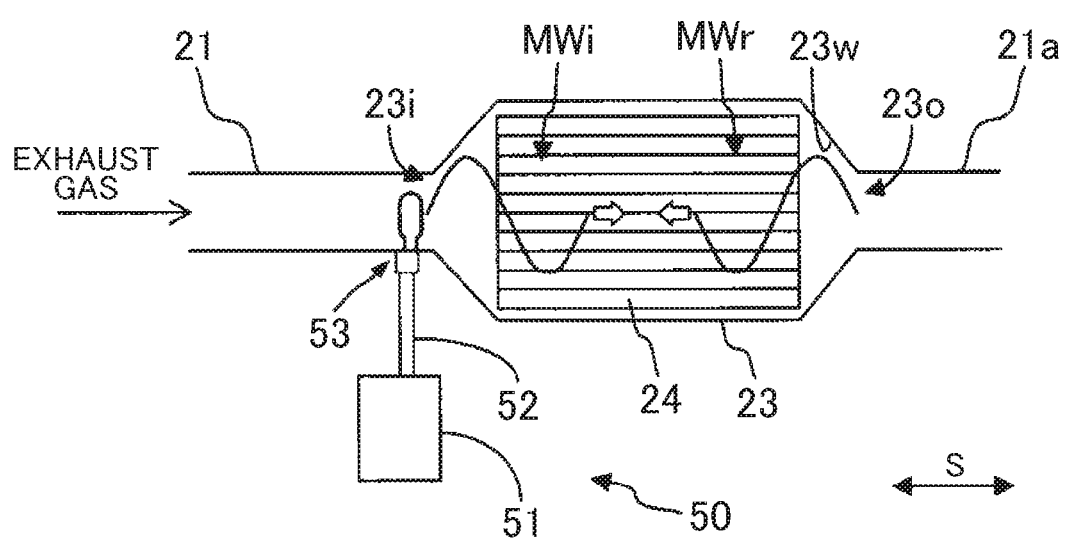
FIG. 5 is a view that explains an operation of a microwave irradiator.

As shown in FIG. 5, a traveling wave MWi of the microwave that is radiated from the microwave radiator 53 toward the startup exhaust gas purification catalyst 24 enters the housing 23 from an entry end 23i of the housing 23. At this time, the inside of the housing 23 is almost occupied by the startup exhaust gas purification catalyst 24, and the carrier substrate 70 that occupies a large part of the startup exhaust gas purification catalyst 24 is formed of a material that the microwave can substantially penetrate. Thus, the inside of the housing 23 is like a hollow space (a cavity) to the microwave, and the traveling wave MWi of the microwave can travel through the housing 23 while being rarely obstructed by the startup exhaust gas purification catalyst 24. In the housing 23, the traveling wave MWi of the microwave and a reflected wave MWr that is generated by the traveling wave MWi being reflected on a wall surface 23w in the housing 23 are combined to form the standing wave that spreads in the housing 23 in three dimensions. Thus, the standing wave is formed to overlap the startup exhaust gas purification catalyst 24 in the housing 23. Noted that, in another embodiment, which is not shown, a radio wave shield member such as metal mesh that prevents leakage of the microwave from an exit end 23o of the housing 23 to the exhaust pipe 21 is disposed at the exit end 23o.

Figure 6:
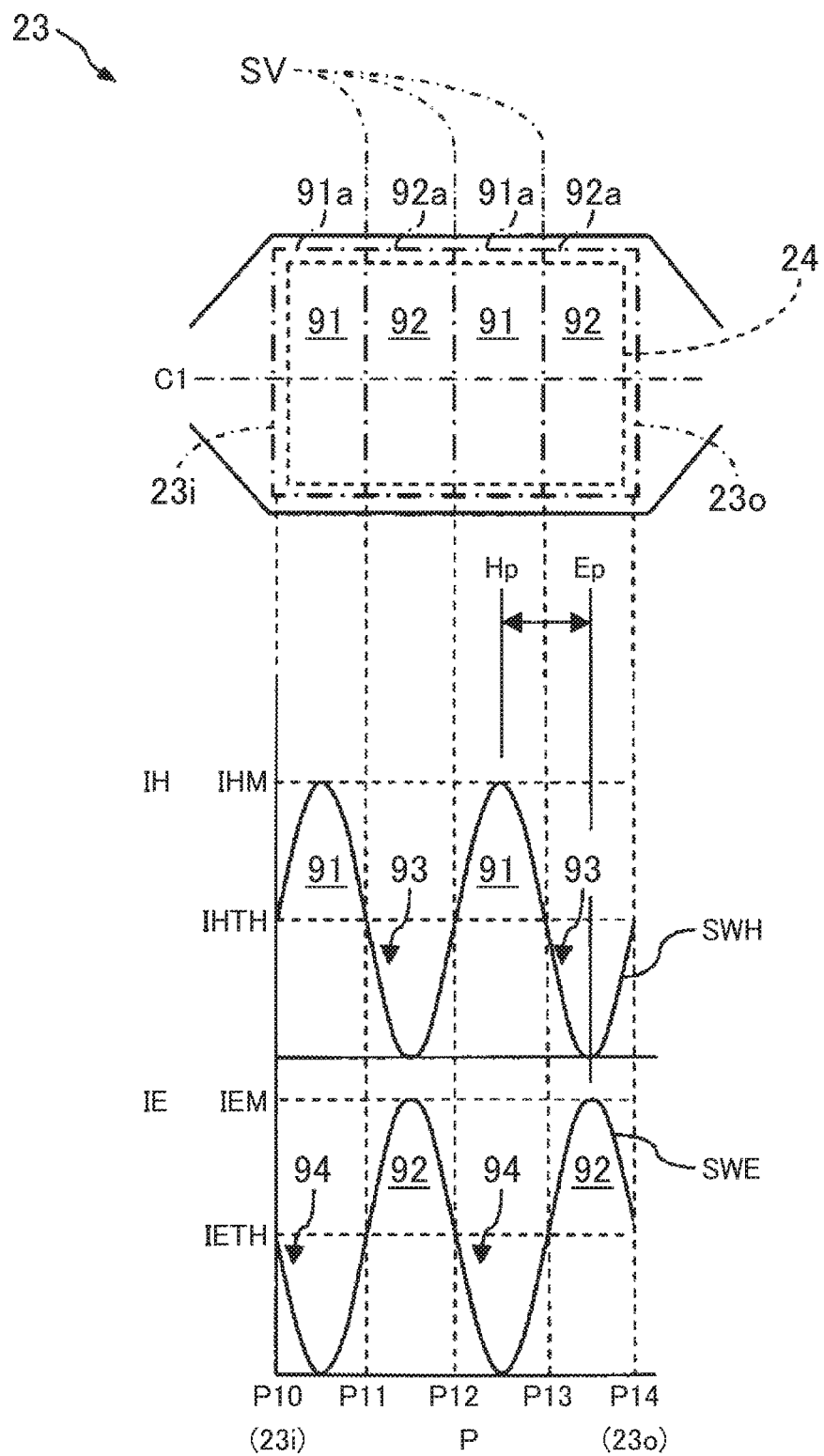
FIG. 6 is a schematic view that shows a characteristic of a standing wave.

FIG. 6 is a schematic view that shows a characteristic of a standing wave. Here, a view on an upper side is a side view of the housing 23. The housing 23 is formed such that a direction from the entry end 23i toward the exit end 23o of the housing 23 becomes a longitudinal direction, and C1 indicates a longitudinal center line of the housing 23 that is parallel to the longitudinal direction. In the embodiment shown in FIG. 6, the longitudinal direction of the housing 23 is aligned with a flow direction of the exhaust gas. A view on a lower side is a graph that shows magnetic field intensity IH and electric field intensity IE of the standing wave that is formed at a position on the longitudinal center line C1 in the housing 23. A horizontal axis indicates a position P in the housing 23 on the longitudinal center line C1, and a vertical axis indicates the magnetic field intensity IH and the electric field intensity IE. In the graph, the magnetic field intensity is indicated by a magnetic field component SWH of the standing wave, and the electric field intensity is indicated by an electric field component SWE of the standing wave. Noted that, in the embodiment shown in FIG. 5, the microwave radiator 53 is a loop antenna and is disposed near the entry of the housing 23. In addition, the antenna is disposed on an extended line of the longitudinal center line C1 of the housing 23.

As shown in the view on the lower side in FIG. 6, the standing wave is distributed in the housing 23 along the longitudinal center line C1 such that, as the magnetic field component SWH of the standing wave, a high magnetic field region 91 in which the magnetic field intensity IH is high and a low magnetic field region 93 in which the magnetic field intensity IH is low are alternately repeated. In addition, the standing wave is distributed in the housing 23 along the longitudinal center line C1 such that, as the electric field component SWE of the standing wave, a high electric field region 92 in which the electric field intensity IE is high and a low electric field region 94 in which the electric field intensity IE is low are alternately repeated. Here, the high magnetic field region 91 is a region in the housing 23 where the magnetic field intensity IH becomes at least equal to a specified rate (e.g., 50%) of a maximum value IHM thereof, that is, becomes at least equal to magnetic field intensity IHTH. The low magnetic field region 93 is a region in the housing 23 where the magnetic field intensity IH becomes lower than the specified rate of the maximum value IHM thereof, that is, becomes lower than the magnetic field intensity IHTH. In addition, the high electric field region 92 is a region in the housing 23 where the electric field intensity IE becomes at least equal to a specified rate (e.g., 50%) of a maximum value IEM thereof, that is, becomes at least equal to electric field intensity IETH. The low electric field region 94 is a region in the housing 23 where the electric field intensity IE becomes lower than the specified rate of the maximum value IEM thereof, that is, becomes lower than the electric field intensity IETH. In the embodiment shown in FIG. 6, the high magnetic field region 91 is a region from a position P10 (the entry end 23i) to a position P11 and a region from a position P12 to a position P13 in the housing 23. The high electric field region 92 is a region from the position P11 to the position P12 and a region from the position P13 to a position P14 (the exit end 23o) in the housing 23.

In addition, a phase of the magnetic field component SWH and a phase of the electric field component SWE deviate from each other in the standing wave that is formed in the housing 23. In other words, a position where the magnetic field component SWH reaches a peak (the magnetic field intensity obtains the maximum value) and a position where the electric field component SWE reaches a peak (the electric field intensity obtains the maximum value) differ from each other and deviate from each other. For example, in the embodiment shown in the view on the lower side in FIG. 6, as it is shown that a position where the magnetic field component SWH reaches a peak Hp and a position where the electric field component SWE reaches a peak Ep deviate from each other, the phase of the magnetic field component SWH and the phase of the electric field component SWE deviate from each other by ½ wavelength along the longitudinal center line C1. Thus, the high magnetic field region 91 and the high electric field region 92 deviate from each other by ½ wavelength in the longitudinal direction, and the low magnetic field region 93 and the low electric field region 94 deviate from each other by ½ wavelength. In other words, the high magnetic field region 91 and the high electric field region 92 are distributed in the housing 23 in a manner to be alternately repeated in the longitudinal direction. Noted that a shape and a degree of deviation of the phase of the standing wave are defined by, for example, the frequency of the microwave and a shape of the housing 23.

In this embodiment, the distributions of the magnetic field intensity and the electric field intensity at the position on the longitudinal center line C1, that is, the distributions in the view on the lower side of FIG. 6 represent the distributions of the magnetic field intensity and the electric field intensity in the entire housing 23. The details are as described below. First, in the housing 23 shown in the view on the upper side of FIG. 6, regions 91a, 92a in thin columnar shapes that are formed by virtually cutting the housing 23 into round slices along perpendicular surfaces SV to the longitudinal center line C1 are considered. Here, the regions 91a, 92a are formed such that a position of the region 91a corresponds to a position of the high magnetic field region 91, and a position of the region 92a corresponds to a position of the high electric field region 92. That is, when being indicated by the positions on the longitudinal center line C1, the region 91a is the region from the position P10 to the position P11 and the region from the position P12 and the position P13, and the region 92a is the region from the position P11 to the position P12 and the region from the position P13 to the position P14. Then, it is assumed that the entire region 91a is the high magnetic field region 91 and that the entire region 92a is the high electric field region 92. As such, the distributions of the magnetic field intensity and the electric field intensity in the housing 23 correspond to distributions of the region 91a as the high magnetic field region 91 and the region 92a as the high electric field region 92 that are alternately aligned along the longitudinal center line C1.

The startup exhaust gas purification catalyst 24 is disposed in the housing 23 that has such distributions of the magnetic field intensity and the electric field intensity. Here, a shape of an internal space of the housing 23 substantially corresponds to an outer shape of the startup exhaust gas purification catalyst 24. Accordingly, the longitudinal direction of the housing 23 corresponds to a longitudinal direction of the startup exhaust gas purification catalyst 24 (the carrier substrate), and the longitudinal center line C1 of the housing 23 corresponds to a longitudinal center line of the startup exhaust gas purification catalyst 24. Thus, in the following description, the longitudinal center line of the startup exhaust gas purification catalyst 24 will also be denoted by C1. In addition, the startup exhaust gas purification catalyst 24 is disposed in a region in the housing 23 that is from the position P10 of the entry end 23i to the position P14 of the exit end 23o. Accordingly, by identifying the position P of the housing 23 on the longitudinal center line C1, the position of the startup exhaust gas purification catalyst 24 on the longitudinal center line C1 can be identified. Thus, in the following description, a position in the startup exhaust gas purification catalyst 24 will also be described as the position P (e.g., the position P10).

Figure 7:
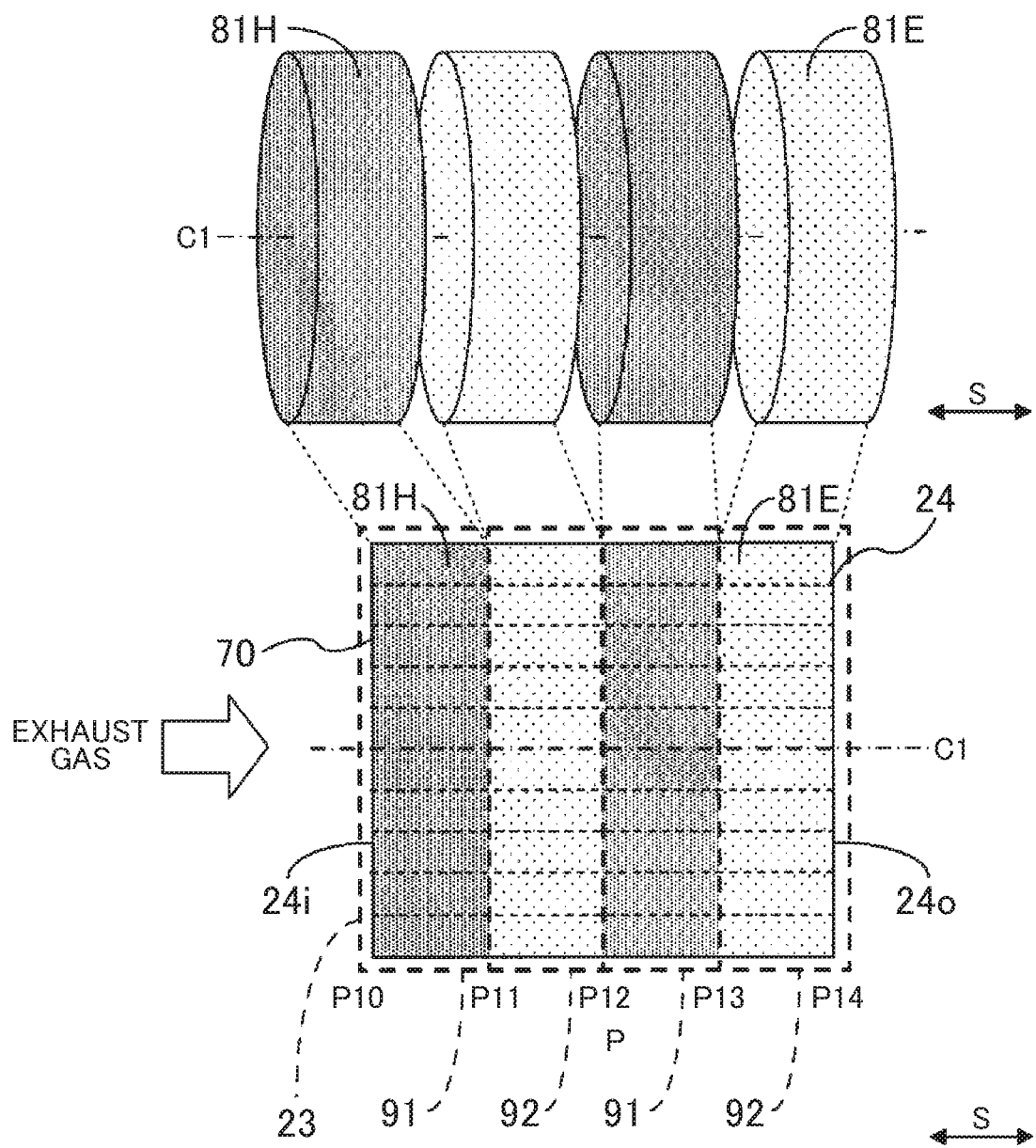
FIG. 7 is a schematic view of a startup exhaust gas purification catalyst.

FIG. 7 is a schematic view of a startup exhaust gas purification catalyst. In FIG. 7, a view on an upper side is a virtual exploded perspective view of the startup exhaust gas purification catalyst 24, and a view on a lower side is a side view of the startup exhaust gas purification catalyst 24.

In the embodiment shown in FIG. 7, the carrier substrate 70 has a configuration that a magnetic body region 81H and a dielectric region 81E in thin columnar shapes are alternately aligned along the longitudinal center line C1. Here, the magnetic body region 81H is a thin-columnar region of the carrier substrate 70 and contains the magnetic body, and the dielectric region 81E is a thin-columnar region of the carrier substrate 70 and contains the dielectric. In addition, as shown in the view on the lower side, the magnetic body region 81H is located in the high magnetic field region 91 in the housing 23, and the dielectric region 81E is located in the high electric field region 92 in the housing 23. That is, in the startup exhaust gas purification catalyst 24, the magnetic body region 81H is the region from the position P10 (an entry end 24i) to the position P11 and the region from the position P12 to the position P13, and the dielectric region 81E is the region from the position P11 to the position P12 and the region from the position P13 to the position P14 (an exit end 24o). In other words, the standing wave is formed such that the high magnetic field region 91 is located in the magnetic body region 81H, and the high electric field region 92 is located in the dielectric region 81E.

In the embodiment shown in FIG. 7, a carried amount of the magnetic body that is deposited on the entire carrier substrate 70 is substantially even in each of the magnetic body regions 81H. In addition, the carried amounts of the magnetic body among the plural magnetic body regions 81H are substantially the same. Similarly, a carried amount of the dielectric that is deposited on the entire carrier substrate 70 is substantially even in each of the dielectric regions 81E. In addition, the carried amounts of the dielectric among the plural dielectric regions 81E are substantially the same.

Figure 8:
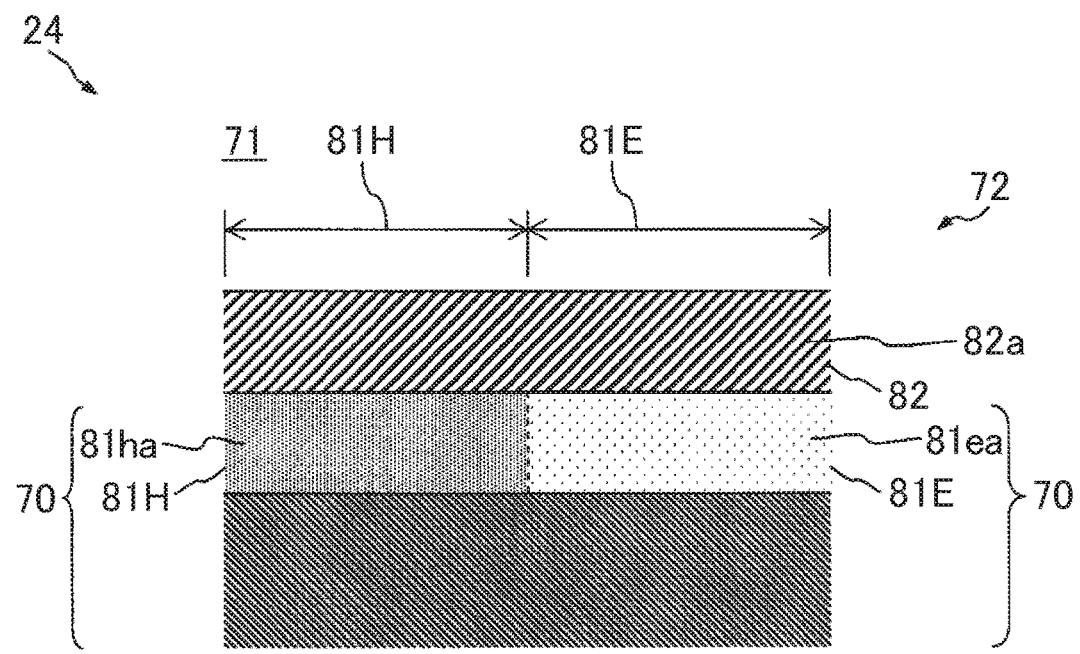
FIG. 8 is a partially enlarged cross-sectional view of a partition wall of a startup exhaust gas purification catalyst.

FIG. 8 is a partially enlarged cross-sectional view of a partition wall of a startup exhaust gas purification catalyst. In the embodiment shown in FIG. 8, the magnetic body region 81H and the dielectric region 81E are formed to be aligned in the carrier substrate 70 of the startup exhaust gas purification catalyst 24. The magnetic body region 81H contains a magnetic body 81ha that can absorb the microwave from the microwave irradiator 50, and the dielectric region 81E contains a dielectric 81ea that can absorb the microwave from the microwave irradiator 50. In the embodiment shown in FIG. 8, the magnetic body region 81H and the dielectric region 81E are formed on a surface of the carrier substrate 70. A catalytic layer 82 is formed on surfaces of the magnetic body region 81H and the dielectric region 81E. The catalytic layer 82 contains a catalytic substance 82a of the exhaust gas purification catalyst, and the catalytic substance 82a is the three-way catalyst in the embodiment shown in FIG. 8. Thus, in the magnetic body region 81H, the magnetic body 81ha is formed on the surface of the carrier substrate 70, and the catalytic substance 82a is formed on a surface of the magnetic body 81ha. In addition, in the dielectric region 81E, the dielectric 81ea is formed on the surface of the carrier substrate 70, and the catalytic substance 82a is formed on a surface of the dielectric 81ea. Furthermore, in another embodiment, which is not shown, the magnetic body 81ha and the dielectric 81ea are contained in the carrier substrate 70, that is, the magnetic body region 81H and the dielectric region 81E are contained in the carrier substrate 70.

Because the phase of the magnetic field intensity IH and the phase of the electric field intensity IE of the standing wave deviate from each other, the high magnetic field region 91 where the magnetic field intensity IH is increased and the high electric field region 92 where the electric field intensity IE is increased in the housing 23 differ from each other. From another perspective, the high magnetic field region 91 and the low electric field region 94 overlap each other, and the low magnetic field region 93 and the high electric field region 92 overlap each other. In this embodiment, the magnetic body region 81H, in which the magnetic body 81ha that can absorb the energy from the magnetic field component of the standing wave is disposed, corresponds to the high magnetic field region 91, and the dielectric region 81E, in which the dielectric 81*ea* that can absorb the energy from the electric field component of the standing wave is disposed, corresponds to the high electric field region 92. In this way, both amounts of the energy absorbed by the magnetic body 81*ha* and the dielectric 81*ea* can be increased. In addition, because the magnetic body region 81H and the dielectric region 81E are formed to be aligned along the longitudinal center line C1, an uneven distribution of the absorbable energy that depends on positions in the startup exhaust gas purification catalyst 24 can be prevented. Thus, an uneven distribution of the temperature in the startup exhaust gas purification catalyst 24 that depends on positions can be suppressed, and the catalytic substance 82*a* (the three-way catalyst) can substantially evenly be heated.

In the embodiment shown in FIG. 7, the magnetic body region 81H and the dielectric region 81E are provided at four positions in total in the carrier substrate 70. The magnetic body region 81H and dielectric region 81E are alternately formed in a direction of the longitudinal center line C1. Accordingly, in the high magnetic field region 91 and the high electric field region 92 that are alternately formed, the energy can efficiently be absorbed by the magnetic body 81*ha* and the dielectric 81*ea*. In this way, the startup exhaust gas purification catalyst 24 can efficiently and evenly be heated.

In addition, in the embodiment shown in FIG. 7, because the magnetic body region 81H and the dielectric region 81E are formed with no gap being formed therebetween in the carrier substrate 70, the entire startup exhaust gas purification catalyst 24 can thoroughly be heated by the microwave. Furthermore, in the embodiment shown in FIG. 7, the magnetic body region 81H and the dielectric region 81E do not overlap each other. Thus, manufacturing of the startup exhaust gas purification catalyst 24 is facilitated.

Moreover, in the embodiment shown in FIG. 7, in the carrier substrate 70, the magnetic body region 81H is formed on a side from which the exhaust gas flows in, that is, an uppermost stream side in the direction of the longitudinal center line C1. A position on the uppermost stream side of the startup exhaust gas purification catalyst 24 tends to become hot by receiving both the heat of the exhaust gas and the energy from the microwave. Thus, where irradiation of the microwave is continued in a state where the uppermost stream side of the startup exhaust gas purification catalyst 24 is heated but a downstream side thereof is not heated, a temperature of the position on the uppermost stream side of the startup exhaust gas purification catalyst 24 possibly becomes excessively high. Here, where the magnetic body 81*ha* with the characteristic shown in FIG. 3 is used, as indicated by a curved line DHt in FIG. 9, the microwave energy absorption rate α1 of the magnetic body 81*ha* starts being decreased at a time when the temperature T thereof becomes at least equal to a specified temperature, and the temperature T is no longer increased even after a lapse of time t. Thus, in the embodiment shown in FIG. 7, the standing wave is formed such that the magnetic body 81*ha* is disposed in an uppermost stream section and the high magnetic field region 91 is located in the uppermost stream section. In this way, even where the microwave is applied in the state where the uppermost stream side of the startup exhaust gas purification catalyst 24 is heated but the downstream side thereof is not heated, a temperature of the uppermost stream section is hardly increased due to a fact that the uppermost stream section does not absorb the microwave significantly. Meanwhile, heating of the downstream side is promoted as the absorption of the microwave is gradually facilitated. Thus, excess heating of the uppermost stream section of the startup exhaust gas purification catalyst 24, which is caused by reception of exhaust heat and microwave heat can be prevented.

In addition, because the magnetic body region 81H in the uppermost stream section is rapidly heated, the startup exhaust gas purification catalyst 24 can efficiently and evenly be heated by transferring heat that is generated in the uppermost stream section to the downstream side through the exhaust gas.

In another embodiment, which is not shown, in each of the magnetic body regions 81H, the carried amount of the magnetic body differs by the position in the magnetic body region 81H. For example, each of the magnetic body regions 81H is divided into plural small regions in the thin columnar shapes in the direction of the longitudinal center line C1. The carried amount of the magnetic body is substantially and thoroughly even in each of the small regions. Among the plural small regions, the carried amount is large in both end sections in the direction of the longitudinal center line C1, and the carried amount is small in a central section. In yet another embodiment, which is not shown, in each of the dielectric regions 81E, the carried amount of the dielectric differs by the position in the dielectric region 81E. For example, each of the dielectric regions 81E is divided into plural small regions in the thin columnar shapes in the direction of the longitudinal center line C1. The carried amount of the dielectric is substantially and thoroughly even in each of the small regions. Among the plural small regions, the carried amount is large in both end sections in the direction of the longitudinal center line C1, and the carried amount is small in a central section. That is, the catalytic substance can further evenly be heated by making the carried amounts further correspond to the distributions of the magnetic field component SWH and the electric field component SWE.

Figure 9:
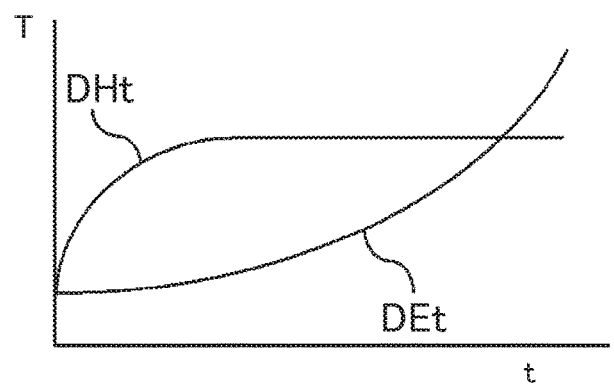
FIG. 9 is a graph that shows characteristics of a magnetic body and a dielectric.
Figure 10:
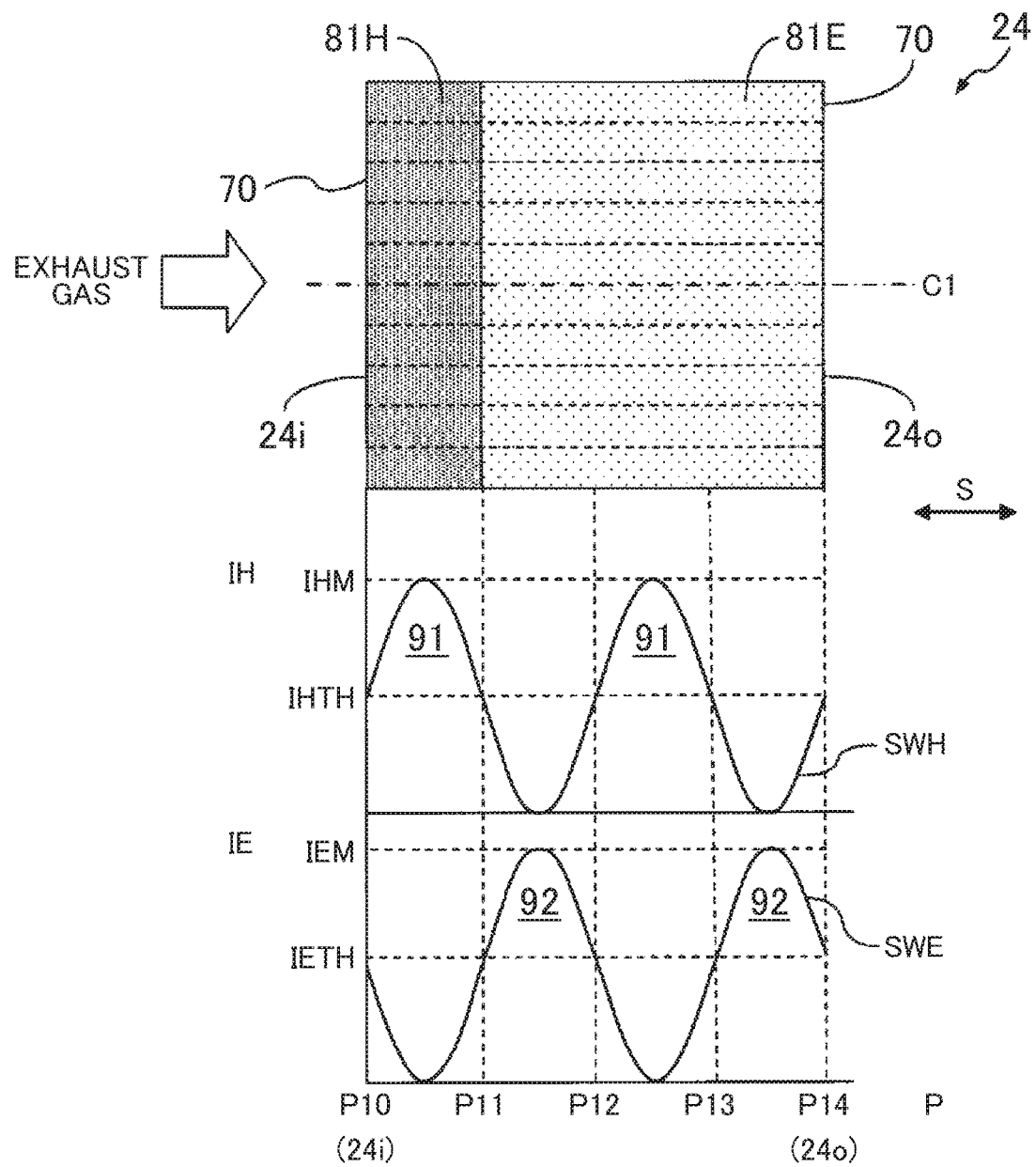
FIG. 10 is a schematic view of a startup exhaust gas purification catalyst in a second embodiment.

In a second embodiment shown in FIG. 10, as shown in a view on an upper side, the magnetic body region 81H is formed in the uppermost stream section of the startup exhaust gas purification catalyst 24, and the dielectric region 81E is formed in the rest of the part, that is, on a downstream side of the magnetic body region 81H. In this embodiment, as shown in a view on a lower side, the standing wave is formed such that the high magnetic field region 91 is located in the uppermost stream section. Due to the characteristic of the magnetic body that is shown in FIG. 9, a front part of the startup exhaust gas purification catalyst 24 can be heated preferentially, and the startup exhaust gas purification catalyst 24 can efficiently and evenly be heated by transferring the heat that is generated in the uppermost stream section to the downstream side through the exhaust gas.

As a method for manufacturing the startup exhaust gas purification catalyst 24 as shown in FIG. 7, a method for forming the magnetic body region 81H and the dielectric region 81E in the thin columnar shapes on the separate carrier substrates, for example, and mutually adhering those by a ceramic adhesive, for example, is considered. As a method for manufacturing each of the magnetic body regions 81H, for example, a method for first applying a slurry that contains the magnetic body 81*ha* to the carrier substrate 70, heating and drying the carrier substrate 70 to form the magnetic body 81*ha*, and thereafter impregnating the magnetic body 81*ha* with the catalytic substance 82*a* by an impregnating method to form the catalytic layer 82 is considered. By the way, as a method for manufacturing each of the dielectric regions 81E, the same method as the method for manufacturing the magnetic body region 81H is considered except for that the dielectric 81ea is used instead of the magnetic body 81ha.

As a method for manufacturing the startup exhaust gas purification catalyst 24 as shown in FIG. 10, for example, a method for applying slurries that respectively contain the magnetic body 81ha and the dielectric 81ea from both of the sides of the one carrier substrate 70 in the direction of the longitudinal center line C1, heating and drying the carrier substrate 70 to form the magnetic body 81ha and the dielectric 81ea, and thereafter impregnating the magnetic body 81ha and the dielectric 81ea with the catalytic substance 82a by the impregnating method to form the catalytic layer 82 is considered. Alternatively, a method for forming the magnetic body region 81H and the dielectric region 81E in the thin columnar shapes on the separate carrier substrates and mutually adhering those by the ceramic adhesive, for example, is considered.

It can be seen that the startup exhaust gas control apparatus 22 that includes the housing and the exhaust gas purification catalyst described above and the microwave irradiator 50 that irradiates the exhaust gas purification catalyst with the microwave constitute a exhaust gas control system for the internal combustion engine that purifies the exhaust gas by heating the exhaust gas purification catalyst with the microwave.

Next, a description will be made on an operation method of the startup exhaust gas control apparatus 22 and the microwave irradiator 50, that is, an operation method of the exhaust gas control system for the internal combustion engine. The exhaust gas control system executes catalytic temperature control as follows. When the temperature of the startup exhaust gas purification catalyst 24 that is detected at a start-up of the engine or by the temperature sensor 61 is lower than a reference temperature that is set in advance, the microwave is radiated from the microwave radiator 53 to the startup exhaust gas purification catalyst 24. Heat is thereby generated in each of the magnetic body region 81H and the dielectric region 81E of the startup exhaust gas purification catalyst 24, the catalytic layer 82 is heated, and the catalytic substance 82a reaches an activation temperature or higher. In this way, the startup exhaust gas purification catalyst 24 functions as the catalyst. As a result, the exhaust gas can be purified by the startup exhaust gas purification catalyst 24. On the other hand, if catalytic reaction in the startup exhaust gas purification catalyst 24 proceeds, the temperature of the startup exhaust gas purification catalyst 24 is increased, and the temperature of the startup exhaust gas purification catalyst 24 that is detected by the temperature sensor 61 becomes at least equal to the reference temperature, radiation of the microwave from the microwave radiator 53 is stopped.

Figure 11:
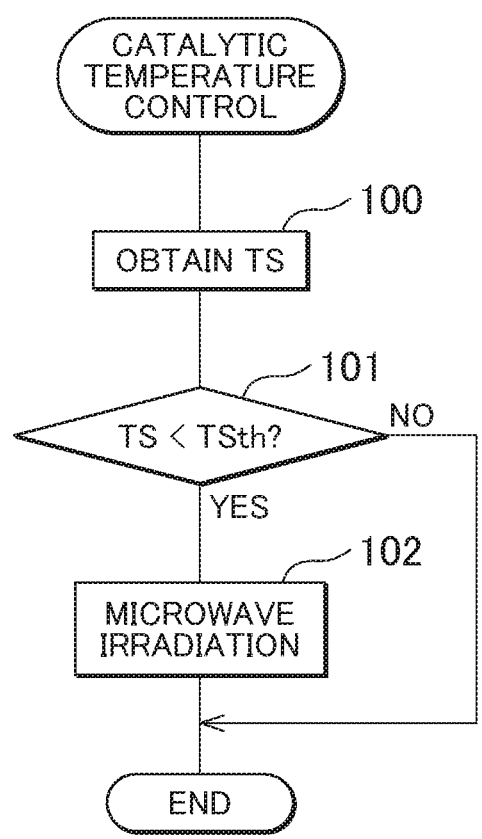
FIG. 11 is a flowchart of catalytic temperature control of an exhaust gas control system.

FIG. 11 shows a routine of executing a catalytic temperature control of an exhaust gas control system for an internal combustion engine described above. This routine is executed by an interrupt at every setting time that is set in advance. With reference to FIG. 11, a temperature TS of the startup exhaust gas purification catalyst 24 is measured by the temperature sensor 61 in step 100. In step 101, it is determined whether the temperature TS is lower than a reference temperature TSth that is set in advance. If the temperature TS is at least equal to the reference temperature TSth, the control process is terminated. If microwave irradiation is conducted at this time, the microwave irradiation is stopped. On the other hand, if the temperature TS is lower than the reference temperature TSth, the microwave irradiator 50 irradiates the startup exhaust gas purification catalyst 24 with the microwave in next step 102. If the microwave irradiation is conducted at this time, the microwave irradiation is continued.

Next, a third embodiment will be described with reference to FIG. 12 and FIG. 13.

Figure 12:
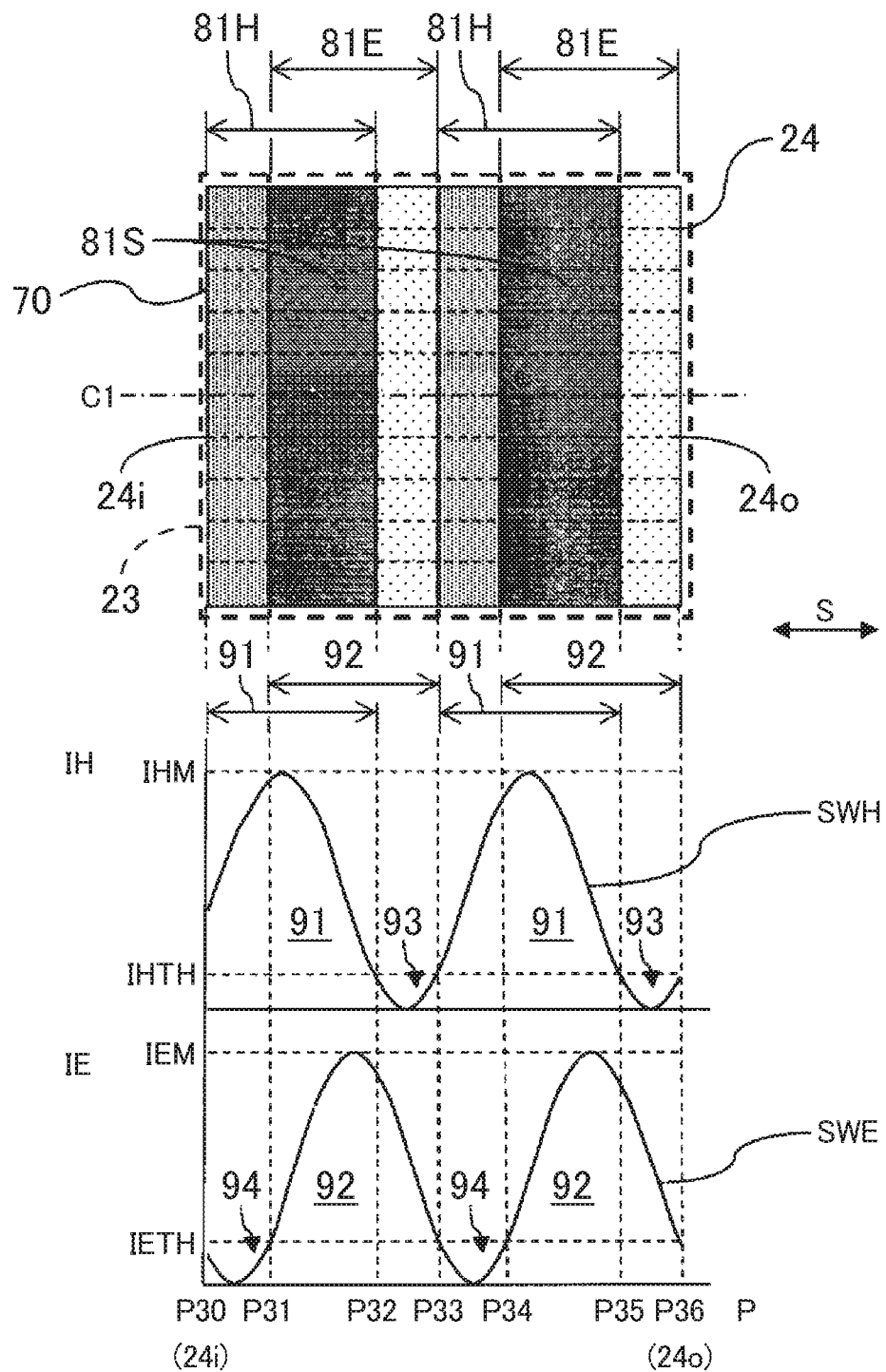
FIG. 12 is a schematic view of a startup exhaust gas purification catalyst in a third embodiment.
Figure 13:
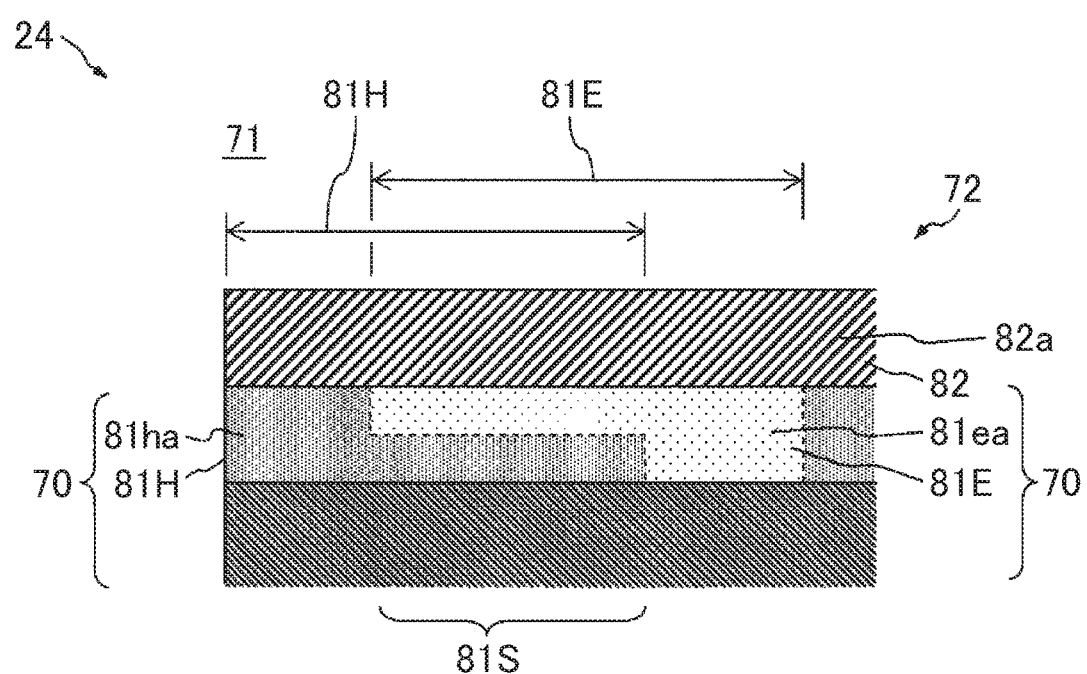
FIG. 13 is a partially enlarged cross-sectional view of a partition wall of the startup exhaust gas purification catalyst of the third embodiment.

The embodiment shown in FIG. 12 and FIG. 13 is an example where the deviation between the phase of the magnetic field component SWH and the phase of the electric field component SWE in the standing wave is smaller than ½ wavelength (e.g., ¼ wavelength) and differs from the embodiment shown in FIG. 6 and FIG. 7 in a point that the magnetic body region 81H and the dielectric region 81E partially overlap each other. Hereinafter, a description will primarily be made on different points.

In the embodiment shown in FIG. 12, as shown in a view on a lower side, the high magnetic field region 91 is a region where the magnetic field intensity IH of the standing wave becomes at least equal to a specified rate (e.g., approximately 20%) of the maximum value IHM thereof, and the high electric field region 92 is a region where the electric field intensity IE of the standing wave becomes at least equal to a specified rate (e.g., approximately 20%) of the maximum value IEM thereof. This specified rate is set lower than the specified rate in the embodiment shown in FIG. 7. A reason therefor is as described below. Where the deviation between the phases of the magnetic field component SWH and the electric field component SWE is small and the specified rate is set to a high value, such as approximately 50% as in the embodiment in FIG. 7, a region that is neither the high magnetic field region 91 nor the high electric field region 92, that is, a region that does not contain the magnetic body or the dielectric is produced. As such, heating of the startup exhaust gas purification catalyst by the microwave possibly becomes uneven. Thus, in the embodiment shown in FIG. 12, the specified rate is set low, so as to eliminate the region that is neither the high magnetic field region 91 nor the high electric field region 92. As a result of this, a region 81S where the magnetic body region 81H and the dielectric region 81E partially overlap each other is formed.

In the embodiment shown in FIG. 12, the magnetic body region 81H is formed in a range from a position P30 (the entry end 24i) to a position P32 and a range from a position P33 to a position P35 as the positions on the longitudinal center line C1 in a manner to correspond to the high magnetic field region 91. In addition, the dielectric region 81E is formed in a range from a position P31 to the position P33 and a range from a position P34 to a position P36 (the exit end 24o) as the positions on the longitudinal center line C1 in a manner to correspond to the high electric field region 92. Thus, the region 81S where the magnetic body region 81H and the dielectric region 81E partially overlap each other is formed in a range from the position P31 to the position P32 and a range from the position P34 to the position P35. In the embodiment shown in FIG. 13, the magnetic body region 81H is formed on the surface of the carrier substrate 70 in the region 81S, and the dielectric region 81E is formed thereon. In another embodiment, which is not shown, the dielectric region 81E is formed on the surface of the carrier substrate 70 in this region 81S, and the magnetic body region 81H is formed thereon. In yet another embodiment, which is not shown, the magnetic body 81ha and the dielectric 81ea are mixed in this region 81S.

Also in this embodiment, a similar effect to that of the embodiment in FIG. 7 can be obtained. In addition, even where the deviation between the phase of the magnetic field component SWH and the phase of the electric field component SWE is small, the region that is neither the magnetic body region 81H nor the dielectric region 81E, that is, the region that is not heated by the microwave is produced by making the magnetic body region 81H and the dielectric region 81E partially overlap each other, and thus the startup exhaust gas purification catalyst 24 can be prevented from being unevenly heated by the microwave. That is, the startup exhaust gas purification catalyst 24 can evenly be heated.

Next, a fourth embodiment will be described with reference to FIG. 14 and FIG. 15.

Figure 14:
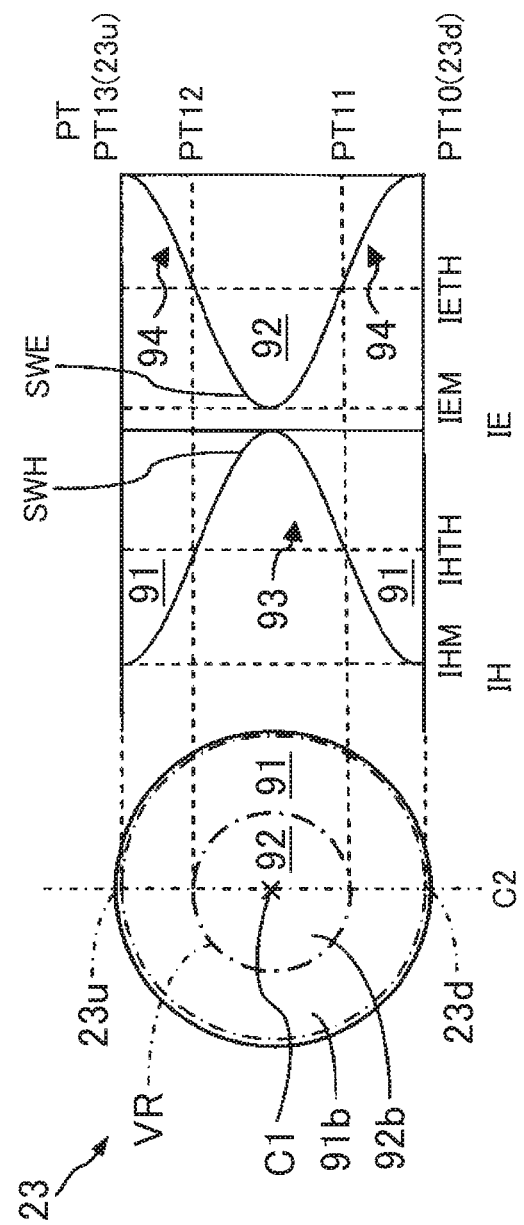
FIG. 14 is a schematic view that shows a characteristic of a standing wave.
Figure 15:
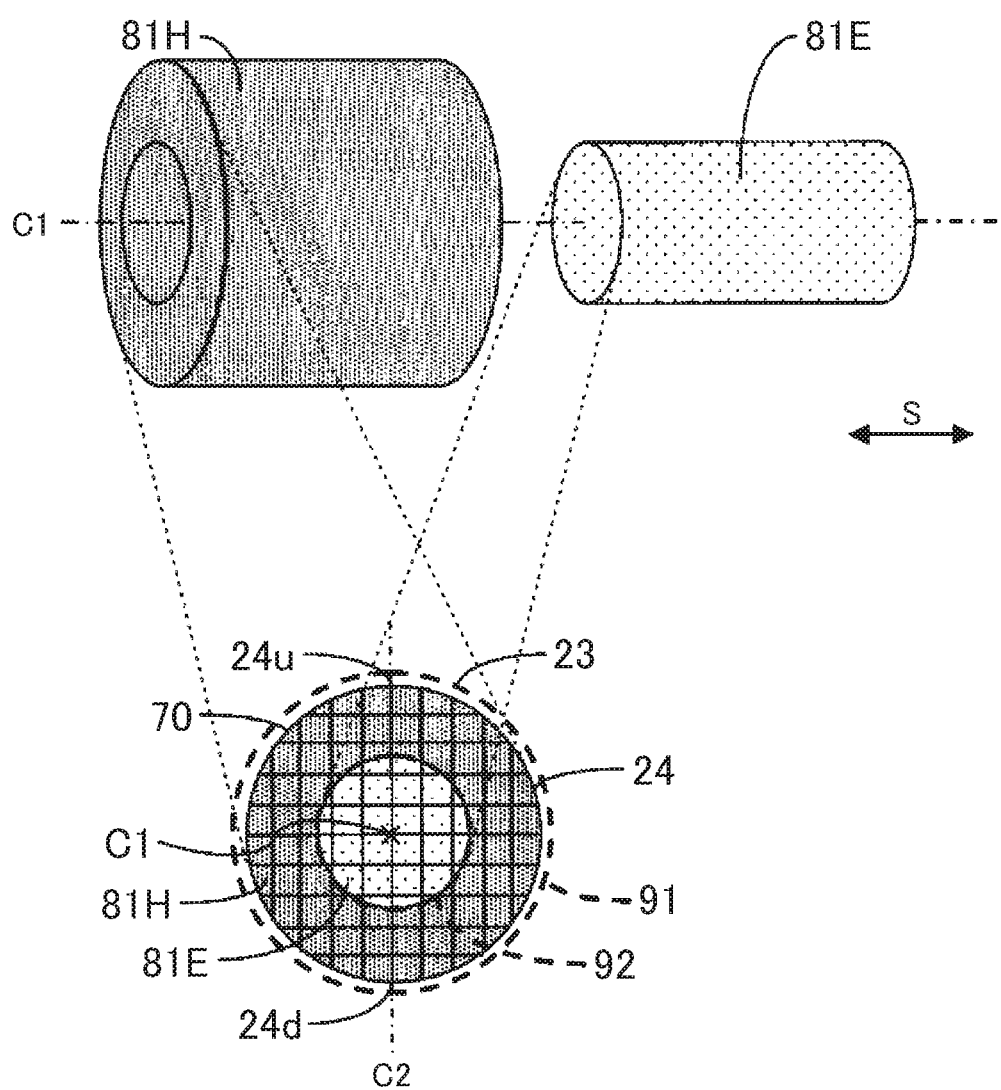
FIG. 15 is a schematic view of a startup exhaust gas purification catalyst of a fourth embodiment.

Compared to the embodiment shown in FIG. 6 and FIG. 7, the embodiment shown in FIG. 14 and FIG. 15 differs from the embodiment shown in FIG. 6 and FIG. 7 in points that the magnetic body region 81H and the dielectric region 81E are formed to be alternately aligned along a perpendicular direction to the longitudinal center line C1 and that the magnetic body 81*ha* and the dielectric 81*ea* are uniformly formed in the direction of the longitudinal center line C1. Hereinafter, the description will primarily be made on the different points.

FIG. 14 is a schematic view that shows a characteristic of a standing wave. Here, a view on a left side is a front view of the housing 23. C2 indicates a line that passes through the longitudinal center line C1 and is in the perpendicular direction to the longitudinal center line C1. A view on a right side is a graph that shows the magnetic field intensity IH and the electric field intensity IE of the standing wave that is formed in the housing 23 at a position on the line C2. A vertical axis indicates a position PT on the line C2 in the housing 23, and a horizontal axis indicates the magnetic field intensity IH and the electric field intensity IE, indicates the magnetic field intensity by the magnetic field component SWH of the standing wave, and indicates the electric field intensity by the electric field component SWE.

As shown in the view on the right side of FIG. 14, the standing wave is distributed in the housing 23 along the line C2 such that the high magnetic field region 91 and the low magnetic field region 93 are alternately repeated as the magnetic field component SWH of the standing wave. In addition, the standing wave is distributed in the housing 23 along the line C2 such that the high electric field region 92 and the low electric field region 94 are alternately repeated as the electric field component SWE of the standing wave. In the embodiment shown in FIG. 14, the high magnetic field region 91 is a region from a position PT10 (a lower end 23*d*) to a position PT11 in the housing 23 and a region from a position PT12 to a position PT13 (an upper end 23*u*). The high electric field region 92 is a region from the position PT11 to the position PT12 in the housing 23. In addition, in the embodiment shown in the view on the right side of FIG. 14, the phase of the magnetic field component SWH and the phase of the electric field component SWE of the standing wave deviate from each other by ½ wavelength along the line C2. Thus, the high magnetic field region 91 and the high electric field region 92 as well as the low magnetic field region 93 and the low electric field region 94 deviate from each other by ½ wavelength along the line C2.

In this embodiment, the distributions of the magnetic field intensity and the electric field intensity at the positions on the line C2, that is, the distributions in the view on the right side of FIG. 14 represent the distributions of the magnetic field intensity and the electric field intensity in the entire housing 23. The details are as will be described below. First, in the housing 23 shown in the view on the left side of FIG. 14, a columnar region 92*b* and an annular region 91*b* that are formed by virtually cutting the housing 23 along a cylindrical curved surface VR with the longitudinal center line C1 as a center line are considered. Here, the regions 92*b*, 91*b* are formed such that a position of the region 92*b* corresponds to the position of the high electric field region 92, and a position of the region 91*b* corresponds to the position of the high magnetic field region 91. That is, when being indicated by positions on the line C2, the region 92*b* is the region from the position PT11 to the position PT12, and the region 91*b* is the region from the position PT10 to the position PT11 and the region from the position PT12 and the position PT13. Then, it is assumed that the entire region 92*b* is the high electric field region 92 and that the entire region 91*b* is the high magnetic field region 91. As such, the distributions of the magnetic field intensity and the electric field intensity in the housing 23 correspond to distributions of the region 92*b* as the high electric field region 92 and the region 91*b* as the high magnetic field region 91 that are alternately aligned along the line C2.

The startup exhaust gas purification catalyst 24 is disposed in the housing 23 that has such distributions of the magnetic field intensity and the electric field intensity. Here, the shape of the internal space of the housing 23 corresponds to the outer shape of the startup exhaust gas purification catalyst 24. Accordingly, the line C2 of the housing 23 corresponds to a perpendicular line to the longitudinal center line of the startup exhaust gas purification catalyst 24. Thus, in the following description, the perpendicular line to the longitudinal center line of the startup exhaust gas purification catalyst 24 will also be denoted by C2. In addition, the startup exhaust gas purification catalyst 24 is disposed in the region from the position PT10 at the lower end 23*d* to the position PT13 at the upper end 23*u* in the housing 23. Accordingly, by identifying the position PT of the housing 23 on the line C2, the position of the startup exhaust gas purification catalyst 24 on the line C2 can be identified. Thus, in the following description, the position in the startup exhaust gas purification catalyst 24 will also be described as a position P (e.g., the position PT10).

FIG. 15 is a schematic view of the startup exhaust gas purification catalyst of the fourth embodiment. In FIG. 15, a view on an upper side is a virtually exploded perspective view of the startup exhaust gas purification catalyst, and a view on a lower side is a front view of the startup exhaust gas purification catalyst.

In the embodiment shown in FIG. 15, the carrier substrate 70 has a configuration that the columnar dielectric region 81E and the annular magnetic body region 81H are alternately aligned from the longitudinal center line C1 in the perpendicular direction to the longitudinal center line C1, that is, along a line C2 direction. Here, the dielectric region 81E is a columnar region of the carrier substrate 70 with the longitudinal center line C1 as a center axis, and contains the dielectric. The magnetic body region 81H is an annular region of the carrier substrate 70 with the longitudinal center line C1 as the center axis that surrounds an outer side of the dielectric region 81E, and contains the magnetic body. In addition, as shown in the view on the lower side, the dielectric region 81E is located in the high electric field region 92 in the housing 23, and the magnetic body region 81H is located in the high magnetic field region 91 in the housing 23. In other words, the standing wave is formed such that the high magnetic field region 91 is located in the magnetic body region 81H and that the high electric field region 92 is located in the dielectric region 81E.

Here, a similar effect to that of the embodiment in FIG. 7 can be obtained.

Next, a fifth embodiment will be described with reference to FIG. 16.

Figure 16:
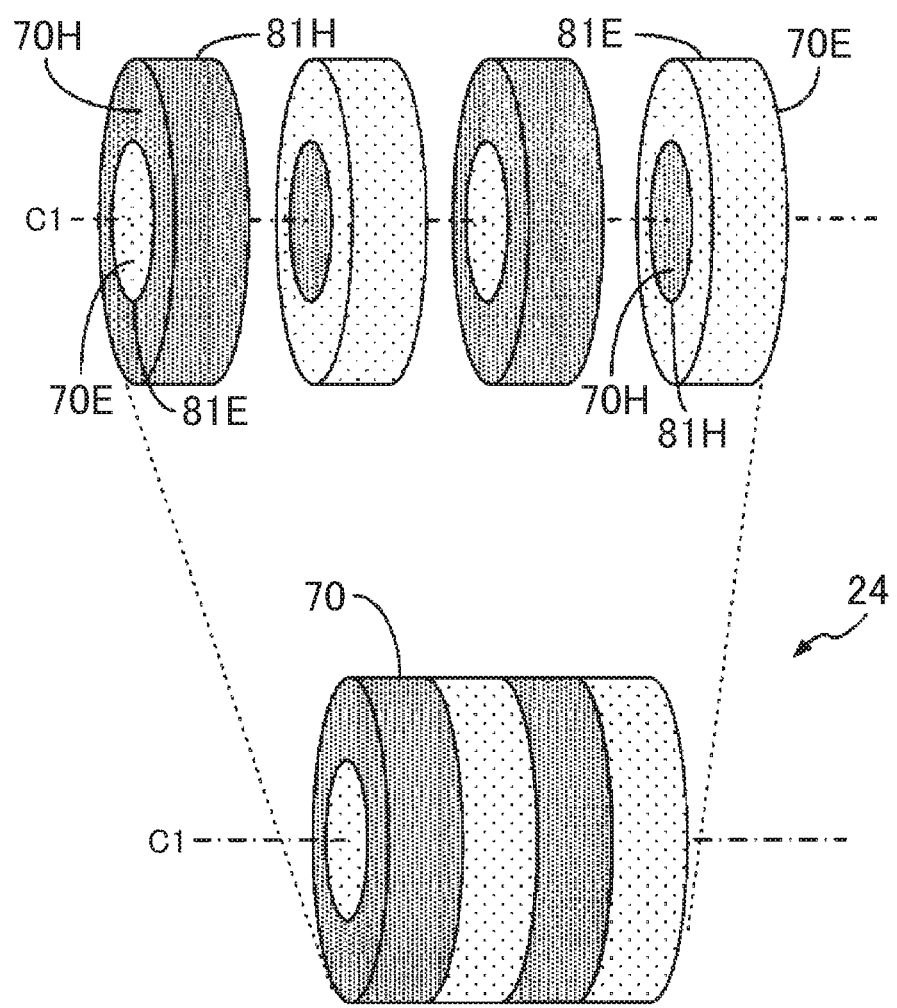
FIG. 16 is a schematic view of a startup exhaust gas purification catalyst of a fifth embodiment.

The embodiment shown in FIG. 16 is an embodiment in which the embodiment shown in FIG. 7 and the embodiment shown in FIG. 15 are combined. That is, the magnetic body region 81H and the dielectric region 81E are further adapted for the three-dimensional distributions of the magnetic field component SWH and the electric field component SWE of the standing wave shown in FIG. 6 and FIG. 14.

In FIG. 6, a region where the magnetic field intensity is low is actually contained in the region 91a that is regarded as the high magnetic field region 91 in the housing 23. For example, such a region is located at a position that is separated from the longitudinal center line C1 in the line C2 direction by a specified distance, and the like. Similarly, in FIG. 14, a region where the magnetic field intensity is low is actually contained in the region 91b that is regarded as the high magnetic field region 91 in the housing 23. For example, such a region is located at a position that is separated in the direction of the longitudinal center line C1 by a specified distance. Accordingly, the three-dimensional distributions of the magnetic field component SWH and the electric field component SWE of the standing wave are roughly reflected in the startup exhaust gas purification catalysts 24 of the embodiments shown in FIG. 7 and FIG. 15. However, it cannot be said that the three-dimensional distributions of the magnetic field component SWH and the electric field component SWE of the standing wave are accurately reflected. Meanwhile, compared to the embodiment shown in FIG. 7 and the embodiment shown in FIG. 15, disposition of the magnetic body region 81H and the dielectric region 81E in the embodiment shown in FIG. 16 further resembles the three-dimensional distributions of the magnetic field component SWH and the electric field component SWE of the standing wave. Thus, the startup exhaust gas purification catalyst 24 can further uniformly be heated.

Next, a description will be made on adjustment of positions of the high magnetic field region and the high electric field region of the standing wave in the housing 23. The microwave irradiator 50, the housing 23, and the startup exhaust gas purification catalyst 24 are formed such that the high magnetic field region and the high electric field region of the standing wave are respectively located in the magnetic body region and the dielectric region of the startup exhaust gas purification catalyst 24. However, it is considered that, when an operation time period of the internal combustion engine becomes long, the position of the standing wave, that is, the positions of the high magnetic field region and the high electric field region possibly deviate by moisture or hydrocarbon (HC) in the exhaust gas. If so, there is a possibility that the microwave cannot sufficiently be absorbed in the magnetic body region and the dielectric region of the startup exhaust gas purification catalyst 24, the heat cannot sufficiently be generated in the magnetic body region and the dielectric region, and thus the startup exhaust gas purification catalyst 24 cannot sufficiently be heated. Thus, dislocation of the high magnetic field region and the high electric field region is prevented by a method which will be described below.

Figure 17:
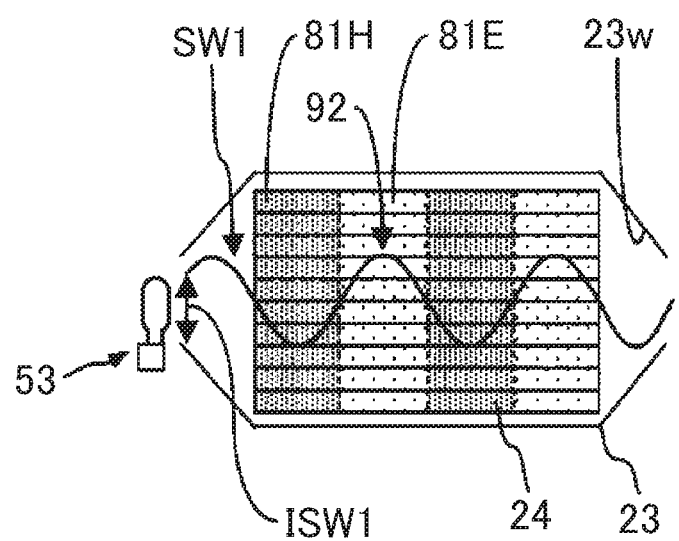
FIG. 17 is a schematic view of a standing wave that is not dislocated in a housing.
Figure 18:
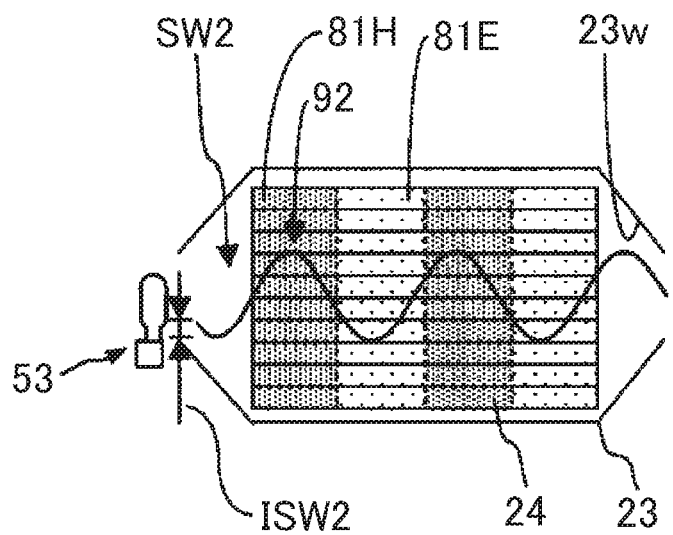
FIG. 18 is a schematic view of a standing wave that is dislocated in a housing.

FIG. 17 and FIG. 18 are schematic views that each show a state of a standing wave in a housing. In the following description, a description will be made on an electric field component SW of the standing wave (hereinafter simply referred to as the standing wave). However, the same applies to the magnetic field component. FIG. 17 shows a standing wave SW1 in which the position of the high electric field region 92 overlaps the position of the dielectric region 81E, that is, that is not dislocated. FIG. 18 shows one example of a standing wave SW2 that is deviated from a position of the standing wave SW1, that is, the standing wave SW2 that is dislocated.

Figure 19:
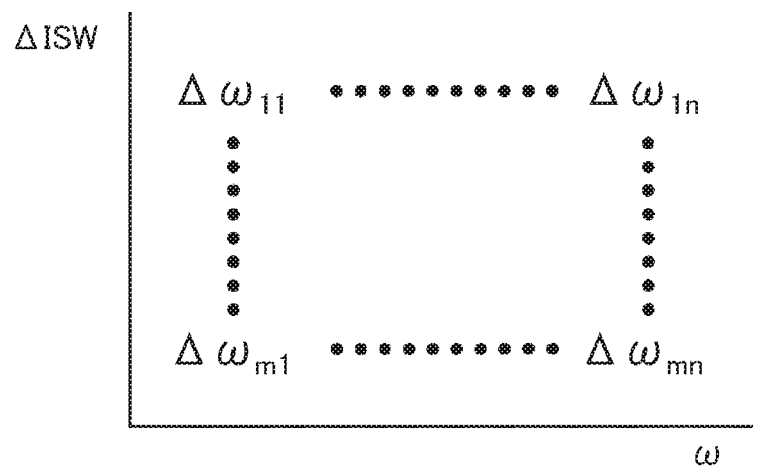
FIG. 19 is a view that shows a map of a change amount $\Delta\omega$ of a frequency.

As shown in FIG. 17, in the standing wave SW1 that is not dislocated, intensity of the standing wave that is measured by the microwave oscillator 51 is ISW1. Meanwhile, as shown in FIG. 18, in the standing wave SW2 that is dislocated, the intensity of the standing wave that is measured by the microwave oscillator 51 is ISW2. As shown in FIG. 18, if the dislocation in which the position of the standing wave is deviated from the position of the standing wave SW1 occurs, intensity ISW of the standing wave is changed by a change amount $\Delta ISW = ISW2 - ISW1$. In order to correct dislocation of the standing wave SW, that is, in order to return the intensity ISW2 of the standing wave to the intensity ISW1, a method for changing a frequency $\omega$ of the microwave that is output from the microwave oscillator 51 by $\Delta\omega$ is considered, for example. Such a change amount $\Delta\omega$ of the frequency $\omega$ is stored in the ROM 32 of the electronic control unit 30 as a function of the frequency $\omega$ of the microwave and the change amount $\Delta ISW$ of the intensity of the standing wave in a form of a map that is shown in FIG. 19, for example.

Figure 20:
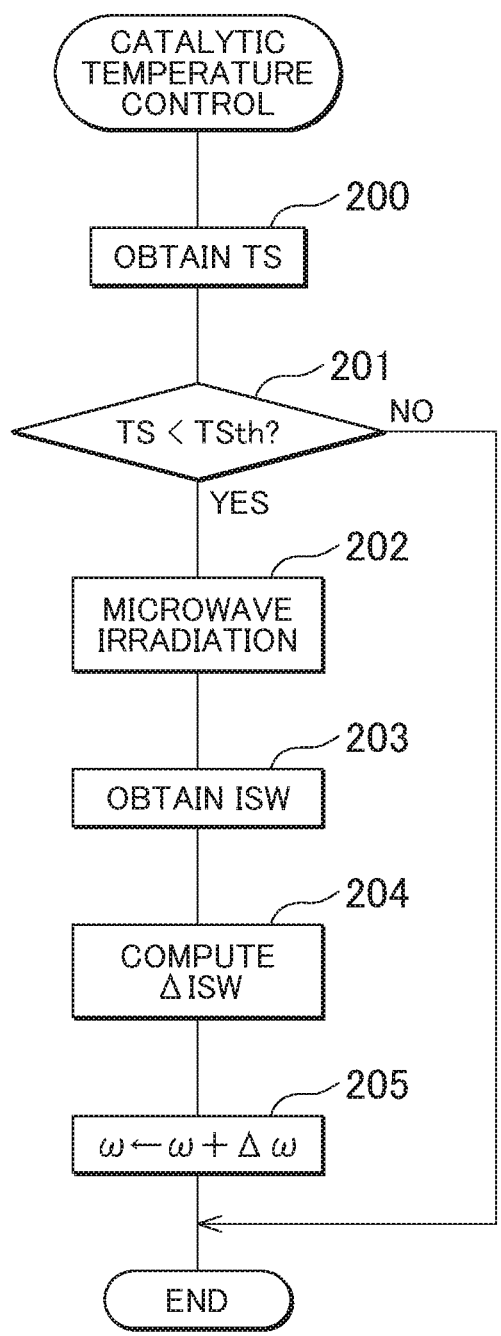
FIG. 20 is a flowchart of control of microwave irradiation that includes dislocation correction of the fifth embodiment.

FIG. 20 shows a routine for executing control of the microwave irradiation that includes control for correcting the above-described dislocation. This routine is executed by the interrupt at every setting time that is set in advance. With reference to FIG. 20, the temperature TS of the startup exhaust gas purification catalyst 24 is measured by the temperature sensor 61 in step 200. In step 201, it is determined whether the temperature TS is lower than the reference temperature TSth that is set in advance. If the temperature TS is at least equal to the reference temperature TSth, the control process is terminated. If the microwave irradiation is conducted, the microwave irradiation is stopped. On the other hand, if the temperature TS is lower than the reference temperature TSth, the microwave irradiator 50 irradiates the startup exhaust gas purification catalyst 24 with the microwave or the microwave irradiation is continued in next step 202. In following step 203, the intensity ISW2 of the standing wave is measured by the microwave oscillator 51. In following step 204, the change amount $\Delta ISW$ is computed from the measured intensity ISW2 of the standing wave and the intensity ISW1 of the standing wave in a case of no displacement. In following step 205, the change amount $\Delta\omega$ is computed from the current frequency $\omega$ of the microwave and the change amount $\Delta ISW$ with reference to a map of FIG. 19, and the frequency $\omega$ of the microwave is changed to $(\omega+\Delta\omega)$.

Figure 21:
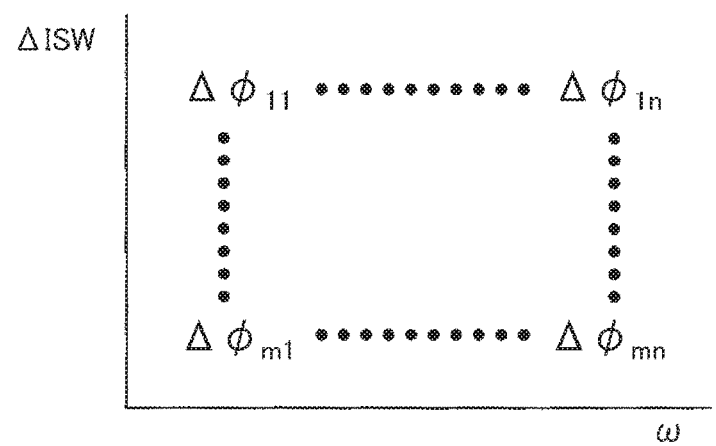
FIG. 21 is a view that shows a map of a change amount $\Delta\varphi$ of a phase.

In another embodiment, instead of changing the frequency $\omega$ of the microwave by $\Delta\omega$, a phase $\phi$ of the microwave is changed by $\Delta\phi$ on the basis of the change amount $\Delta ISW$ and the frequency $\omega$ of the microwave. Such a change amount $\Delta\phi$ of the phase $\phi$ is stored in the ROM 32 of the electronic control unit 30 as a function of the frequency $\omega$ of the microwave and the change amount $\Delta ISW$ of the intensity of the standing wave in a form of a map that is shown in FIG. 21, for example.

In another embodiment, which is not shown, the above change amounts $\Delta\omega$ and $\Delta\phi$ are changed simultaneously. Such change amounts $(\Delta\omega, \Delta\phi)$ are stored in the ROM 32 of the electronic control unit 30 in a form of a map (not shown) as a function of the frequency $\omega$ of the microwave and the change amount $\Delta ISW$ of the intensity of the standing wave, for example. In another embodiment, which is not shown, the intensity of the reflected wave is used instead of the intensity of the standing wave.

In addition, in another embodiment, which is not shown, the entire catalytic layer 82 is further evenly heated by using the method for adjusting the positions of the high magnetic field region and the high electric field region of the standing wave in the housing 23 described above. As shown in FIG. 7 above, also in the high magnetic field region 91, because the magnetic field intensity IH is unevenly distributed, the magnetic body region 81H is not necessarily heated uniformly, and a position in the magnetic body region 81H where the magnetic field intensity IH reaches the peak is heated the most. Thus, in this embodiment, the frequency and the phase of the microwave from the microwave oscillator 51 are changed irrespective of the dislocation, and the peak of the magnetic field intensity IH in the high magnetic field region of the standing wave is moved forward or backward in the direction of the longitudinal center line C1. In this way, the heat can be generated in the magnetic body region 81H of the catalytic layer 82 in a uniform manner in the direction of the longitudinal center line C1 by using the magnetic field intensity at the peak. As a result, the catalytic layer 82 on the magnetic body region 81H can thoroughly be heated in the direction of the longitudinal center line C1. Similarly, the catalytic layer 82 on the dielectric region 81E can thoroughly be heated in the direction of the longitudinal center line C1 by moving the peak of the electric field intensity in the high electric field region of the standing wave forward or backward in the direction of the longitudinal center line C1.

In addition, in another embodiment, which is not shown, the entire catalytic layer 82 is further evenly heated by using the method for adjusting the positions of the high magnetic field region and the high electric field region of the standing wave in the housing 23 described above. First, the frequency and the phase of the microwave from the microwave oscillator 51 are changed, and the high magnetic field region and the high electric field region of the standing wave are moved along the longitudinal center line C1 in the startup exhaust gas purification catalyst 24. Then, by measuring the intensity ISW of the standing wave by the microwave oscillator 51, presence or absence of a discontinuous part in the change in the intensity ISW of the standing wave is detected. It is considered that a reason for the presence of the discontinuous part is that there is a part in which the absorbed amount of the standing wave is discontinuously large in the magnetic body region 81H and/or the dielectric region 81E. Accordingly, where the discontinuous part is present, the part of the magnetic body region 81H in which the absorbed amount is large and that leads to the discontinuous part, or the part of the dielectric region 81E in which the absorbed amount is large and that leads to the discontinuous part is estimated from a waveform of the standing wave that is predicted from the intensity ISW of the standing wave at the time. For example, where the high magnetic field region and the certain magnetic body region 81H overlap each other in the waveform of the standing wave, it is estimated that the magnetic body region 81H is the part in which the absorbed amount of the standing wave is large. Similarly, where the high electric field region and the certain dielectric region 81E overlap each other in the waveform of the standing wave, it is estimated that the dielectric region 81E is the part in which the absorbed amount of the standing wave is large. Where the absorbed amount in the magnetic body region 81H is large, it is considered from the characteristic of the magnetic body in FIG. 3 that the temperature in the magnetic body region 81H is low. Accordingly, in order to increase the magnetic field intensity in the magnetic body region 81H, the frequency ω and the phase φ are controlled, and the standing wave is moved. In addition, where the absorbed amount in the dielectric region 81E is large, it is considered from the characteristic of the dielectric in FIG. 4 that the temperature in the dielectric region 81E is high. Accordingly, in order to increase the electric field intensity in the regions other than the dielectric region 81E, the frequency ω and the phase φ are controlled, and the standing wave is moved.

Next, a sixth embodiment will be described with reference to FIG. 22.

Figure 22:
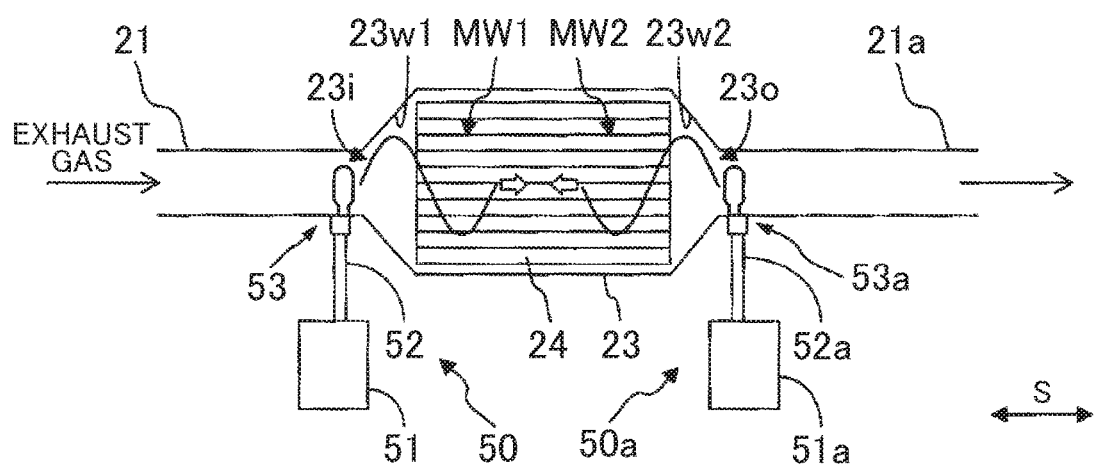
FIG. 22 is a view that explains operations of two microwave irradiators.

Compared to the embodiment shown in FIG. 5, the embodiment shown in FIG. 22 differs from the embodiment shown in FIG. 5 in a point that the two microwave irradiators are disposed. Hereinafter, a description will primarily be made on the different point.

In the embodiment shown in FIG. 22, not only a first microwave irradiator 50 is disposed on the upstream side of the startup exhaust gas control apparatus 22 in the exhaust pipe 21, but also a second microwave irradiator 50a is disposed on the downstream side of the startup exhaust gas control apparatus 22 in the exhaust pipe 21.

As shown in FIG. 22, the second microwave irradiator 50a causes a second microwave MW2 (e.g., second frequency 2.45 GHz±Δ) that is generated by a second microwave oscillator 51a to be radiated from a second microwave radiator 53a toward the startup exhaust gas control apparatus 22 via a transmission line 52a. The second microwave MW2 enters the housing 23 from the exit end 23o of the housing 23. Meanwhile, a first microwave MW1 from the first microwave radiator 53 of the first microwave irradiator 50 enters the housing 23 from the entry end 23i of the housing 23. As such, the second microwave MW2 and a reflected wave thereof in the housing 23 as well as the first microwave MW1 and a reflected wave thereof in the housing 23 overlap each other in the housing 23, and the standing wave is thereby formed in the housing 23.

Next, a description will be made on the adjustment of the positions of the high magnetic field region and the high electric field region of the standing wave in the housing 23 in the embodiment shown in FIG. 22. Similar to in FIG. 17 and FIG. 18, where the positions of the high electric field region and the high magnetic field region are deviated from normal positions by the moisture or the like in the exhaust gas, the change in the intensity ISW of the standing wave is measured by at least one of the first microwave irradiator 50 and the second microwave irradiator 50a. Accordingly, similar to in FIG. 17 and FIG. 18, the frequency ω of the microwave of at least one of the first microwave irradiator 50 and the second microwave irradiator 50a is changed on the basis of the change amount ΔISW of the intensity ISW of the standing wave that is measured by at least one of the first microwave irradiator 50 and the second microwave irradiator 50a. In this way, the intensity ISW of the standing wave can be returned to have a normal value. Alternatively, the intensity ISW of the standing wave can be returned to have a normal value by changing the phase φ of the microwave of at least one of the microwave irradiator 50 and the other microwave irradiator 50a.

In each of the above embodiments, the microwave radiator 53 of the microwave irradiator 50 is disposed on the upstream side of the startup exhaust gas control apparatus 22 in the exhaust pipe 21, and the magnetic body region 81H and the dielectric region 81E are contained in the startup exhaust gas purification catalyst 24. In another embodiment, which is not shown, the microwave radiator 53 of the microwave irradiator 50 is disposed in a position between the downstream side of the startup exhaust gas control apparatus 22 and the upstream side of the primary exhaust gas control apparatus 25 in the exhaust pipe 21, and the magnetic body region 81H and the dielectric region 81E are contained in the primary exhaust gas purification catalyst 27. For example, similar to in FIG. 8, the magnetic body region 81H and the dielectric region 81E are formed on or in the particulate filter as the carrier substrate, and the NOx occlusion reduction catalyst is deposited thereon as the catalytic substance. Also, a similar effect as that in each of the above embodiments can be produced by the primary exhaust gas control apparatus 25. As such, the primary exhaust gas control apparatus 25 that includes a housing and an exhaust gas purification catalyst and the microwave irradiator 50 that irradiates the exhaust gas purification catalyst with the microwave can be regarded as constituting the exhaust gas control system for the internal combustion engine.

What is claimed is:

1. An exhaust gas control system for an internal combustion engine comprising:
    a housing disposed in an exhaust passage of the internal combustion engine;
    an exhaust gas purification catalyst disposed in the housing, the exhaust gas purification catalyst configured to purify exhaust gas of the internal combustion engine; and
    a microwave irradiator disposed on an upstream side or a downstream side of the exhaust gas purification catalyst in the exhaust passage, the microwave irradiator configured to irradiate the exhaust gas purification catalyst with a microwave at a specified frequency such that a standing wave that has: a high magnetic field region where magnetic field intensity becomes at least equal to a specified rate of a maximum value of the magnetic field intensity; and a high electric field region where electric field intensity becomes at least equal to a specified rate of a maximum value of the electric field intensity and in which a position where the magnetic field intensity reaches the maximum value and a position where the electric field intensity reaches the maximum value differ from each other is formed in the housing by the microwave, wherein
    the exhaust gas purification catalyst includes a carrier substrate and a catalytic substance that purifies the exhaust gas, the catalytic substance is disposed on the carrier substrate, the carrier substrate includes a magnetic body region and a dielectric region, the magnetic body region of the carrier substrate is disposed in the high magnetic field region in the housing, the dielectric region of the carrier substrate is disposed in the high electric field region in the housing, the magnetic body region has a magnetic body that absorbs the microwave, and the dielectric region has a dielectric that absorbs the microwave.

2. The exhaust gas control system according to claim 1, wherein the carrier substrate is configured that a direction from an entry end toward an exit end of the housing becomes a longitudinal direction, and the magnetic body region and the dielectric region are disposed to be aligned along a longitudinal center line of the carrier substrate.

3. The exhaust gas control system according to claim 2, wherein the magnetic body region is disposed on an uppermost stream side in the longitudinal direction of the carrier substrate.

4. The exhaust gas control system according to claim 2, wherein the carrier substrate includes the magnetic body region and the dielectric region at three or more positions in total, and the magnetic body region and the dielectric region are alternately disposed in the longitudinal direction.

5. The exhaust gas control system according to claim 1, wherein the carrier substrate is configured that a direction from an entry end toward an exit end of the housing becomes a longitudinal direction, and the magnetic body region and the dielectric region are disposed to be aligned in a perpendicular direction to a longitudinal center line of the carrier substrate.

6. The exhaust gas control system according to claim 1, wherein the magnetic body region and the dielectric region are disposed with no gap being formed therebetween.

7. The exhaust gas control system according to claim 1, wherein the magnetic body region and the dielectric region are disposed to partially overlap each other.

8. The exhaust gas control system according to claim 1, wherein the magnetic body region and the dielectric region are disposed not to overlap each other.

9. The exhaust gas control system according to claim 1, wherein a material of the magnetic body differs from a material of the dielectric.

10. The exhaust gas control system according to claim 1, wherein the magnetic body is disposed on the carrier substrate in the magnetic body region, and the catalytic substance is disposed on the magnetic body.

11. The exhaust gas control system according to claim 1, wherein the dielectric is disposed on the carrier substrate in the dielectric region, and the catalytic substance is disposed on the dielectric.

12. The exhaust gas control system according to claim 1, wherein the microwave irradiator is configured to change a position of the high magnetic field region and a position of the high electric field region by changing at least one of a frequency and a phase of the microwave.

13. The exhaust gas control system according to claim 1, wherein the microwave irradiator contains: a first microwave irradiator that is disposed on the upstream side of the exhaust gas purification catalyst in the exhaust passage; and a second microwave irradiator that is disposed on the downstream side of the exhaust gas purification catalyst therein such that the standing wave is formed in the housing by a first microwave applied by the first microwave irradiator and a second microwave applied by the second microwave irradiator.

14. The exhaust gas control system according to claim 13, wherein at least one of the first microwave irradiator and the second microwave irradiator is configured to change the position of the high magnetic field region and the position of the high electric field region by changing at least one of a frequency and a phase of at least one of the first microwave and the second microwave.

* * * * *